(12) United States Patent
Hu

(10) Patent No.: US 11,458,395 B2
(45) Date of Patent: Oct. 4, 2022

(54) METHOD FOR DISPLAYING INFORMATION IN A VIRTUAL ENVIRONMENT

(71) Applicant: TENCENT TECHNOLOGY (SHENZHEN) COMPANY LIMITED, Shenzhen (CN)

(72) Inventor: Shenyang Hu, Shenzhen (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 208 days.

(21) Appl. No.: 16/904,884

(22) Filed: Jun. 18, 2020

(65) Prior Publication Data
US 2020/0316472 A1 Oct. 8, 2020

Related U.S. Application Data

(63) Continuation of application No. PCT/CN2019/080125, filed on Mar. 28, 2019.

(30) Foreign Application Priority Data

Apr. 27, 2018 (CN) .......................... 201810391238.X

(51) Int. Cl.
A63F 13/54 (2014.01)
G06T 7/73 (2017.01)
(Continued)

(52) U.S. Cl.
CPC ................ *A63F 13/54* (2014.09); *G06F 3/16* (2013.01); *G06T 7/529* (2017.01); *G06T 7/73* (2017.01)

(58) Field of Classification Search
CPC ......... G06T 19/006; G06T 2207/30204; G06T 17/05; G06T 2207/10012;
(Continued)

(56) References Cited

U.S. PATENT DOCUMENTS

2009/0318773 A1* 12/2009 Jung .................... A61B 5/4803
600/300
2013/0130795 A1 5/2013 Hayashi et al.
(Continued)

FOREIGN PATENT DOCUMENTS

CN 107469354 12/2017
CN 107890673 4/2018
(Continued)

OTHER PUBLICATIONS

International Search Report issued in PCT/CN2019/080125 dated Jun. 28, 2019, with English translation.
(Continued)

*Primary Examiner* — Ming Wu
(74) *Attorney, Agent, or Firm* — Crowell & Moring, L.L.P.

(57) ABSTRACT

This disclosure discloses an information display method in a virtual environment. The method includes: obtaining first coordinate of a first virtual object in the virtual environment; obtaining, according to the first coordinate, a second coordinate of a second virtual object located in a first orientation of the first virtual object and in a predetermined behavior state; calculating a first distance between the first virtual object and the second virtual object according to the first coordinate and the second coordinate; obtaining a sound effect intensity of the second virtual object in the first orientation according to the first distance; and transmitting a sound effect display instruction to a first terminal corresponding to the first virtual object.

20 Claims, 12 Drawing Sheets

(51) Int. Cl.
  *G06T 7/529* (2017.01)
  *G06F 3/16* (2006.01)
(58) Field of Classification Search
  CPC . G06T 2207/10016; G06T 2207/10021; G06T 2207/30208; G06T 2215/16; G06T 2219/024; G06T 7/00; G06T 7/11; G06T 7/73; G06T 7/74
  See application file for complete search history.

(56) References Cited

U.S. PATENT DOCUMENTS

| | | | | |
|---|---|---|---|---|
| 2014/0300636 | A1* | 10/2014 | Miyazaya | H04R 5/033 345/633 |
| 2016/0064002 | A1* | 3/2016 | Kim | G11B 20/10527 704/246 |
| 2016/0150314 | A1 | 5/2016 | Nishidate | |
| 2018/0096536 | A1* | 4/2018 | Goto | G06T 7/74 |
| 2018/0201134 | A1* | 7/2018 | Choi | G06T 17/05 |
| 2018/0251230 | A1* | 9/2018 | Chavez | B64D 11/0626 |
| 2019/0270024 | A1* | 9/2019 | Morosini | A63G 31/16 |

FOREIGN PATENT DOCUMENTS

| CN | 108579084 | 9/2018 |
|---|---|---|
| JP | 2012-029096 | 2/2012 |

OTHER PUBLICATIONS

刺激战场 怎么看声音显示.pdf—This reference discloses how to display a sound and a direction of the sound in a battlefield video game.

荒野行动 怎么看声音.pdf—This reference discloses how to display a sound in a wildness action video game.

"终结者2》官方网站.pdf"—This reference discloses how to display the source of a sound in a video game.

* cited by examiner

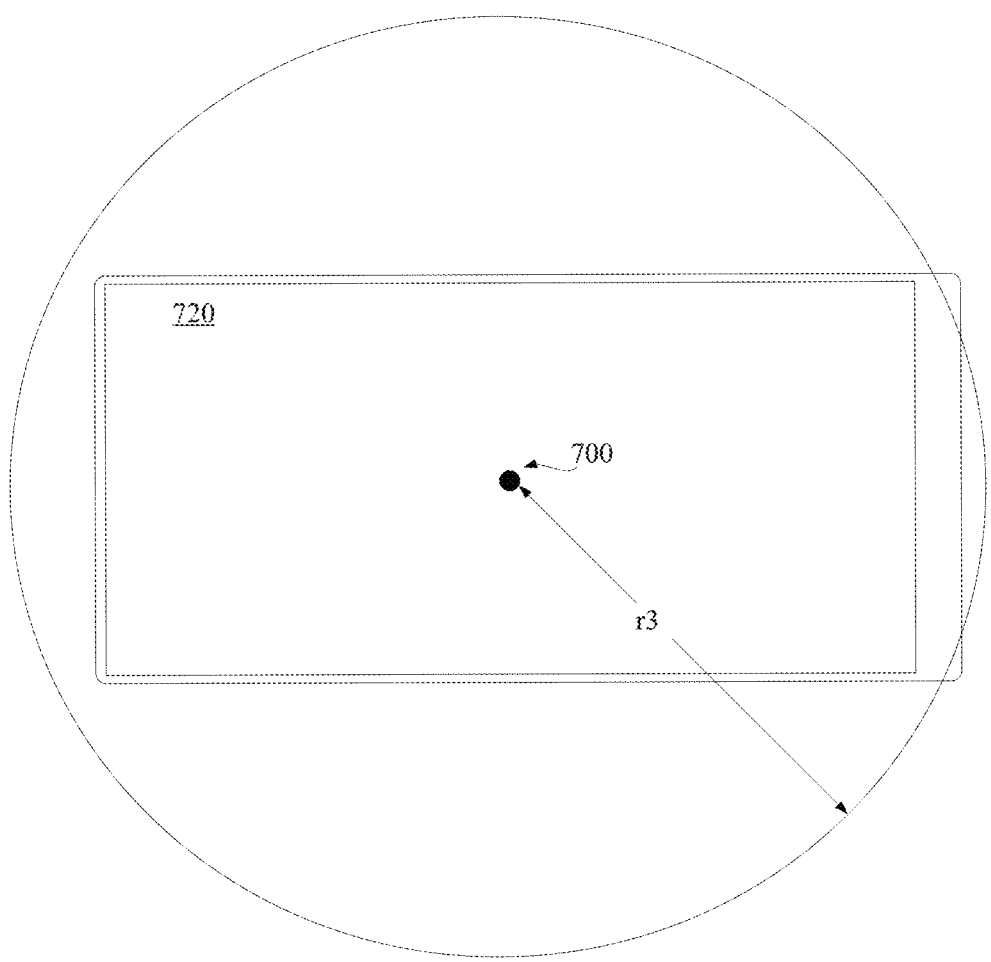

FIG. 12

| Display a first display picture of a virtual environment observed from a oblique view, the first display picture displaying an object model of a first virtual object | 801 |

↓

| Display, in response to a second virtual object in a predetermined behavior state existing in a first orientation of the first virtual object in the virtual environment, a sound effect indication pattern using the first virtual object as a center, the sound effect indication pattern pointing to a direction of a location of the second virtual object | 802 |

FIG. 13

METHOD FOR DISPLAYING INFORMATION IN A VIRTUAL ENVIRONMENT

RELATED APPLICATION

This application is a continuation application of PCT Patent Application No. PCT/CN2019/080125, filed on Mar. 28, 2019, which claims priority to Chinese Patent Application No. 201810391238.X, filed on Apr. 27, 2018 and entitled "INFORMATION DISPLAY METHOD AND APPARATUS IN VIRTUAL ENVIRONMENT, DEVICE, AND STORAGE MEDIUM", wherein the entirety of each of the above-referenced applications is incorporated herein by reference in its entirety.

FIELD OF THE TECHNOLOGY

The disclosure relates to the field of computer technologies, and in particular, to a method for displaying information in a virtual environment.

BACKGROUND OF THE DISCLOSURE

Currently, there are many application programs based on a virtual environment, such as a multiplayer online battle arena game, and a military simulation program. The virtual environment provided by the application program may allow one or more virtual characters to perform an activity, and activities of the virtual character include moving, jumping, attacking, and spell casting.

In the related art, a sound effect playing method in a virtual environment includes: obtaining, by a server, a behavior state of each virtual object in the same virtual environment; determining a sound effect of each virtual object according to the behavior state of each virtual object; and transmitting a playing instruction to a terminal, the playing instruction being used for instructing the terminal to play an individually corresponding sound effect of each virtual object. For example, if a virtual character A is in an attacking state, the terminal plays an attack sound effect. For another example, if a virtual character B is in a state of casting a spell, the terminal plays a sound effect of casting a spell.

SUMMARY

Embodiments of this disclosure provide an information display method and apparatus in a virtual environment, a device, and a storage medium. According to one aspect, an embodiment of this disclosure provides an information display method in a virtual environment, including:

obtaining a first coordinate of a first virtual object in the virtual environment;

obtaining, according to the first coordinate, a second coordinate of a second virtual object located in a first orientation of the first virtual object and in a predetermined behavior state:

calculating a first distance between the first virtual object and the second virtual object according to the first coordinate and the second coordinate;

obtaining a sound effect intensity of the second virtual object in the first orientation according to the first distance; and transmitting a sound effect display instruction to a first terminal corresponding to the first virtual object, the sound effect display instruction instructing the first terminal to display a sound effect indication pattern using the first virtual object as a center in the virtual environment, and the sound effect indication pattern indicating that the second virtual object exists in a location region that is negatively correlated with the sound effect intensity in the first orientation.

According to one aspect, an embodiment of this disclosure provides an information display method in a virtual environment, including:

transmitting a first coordinate of a first virtual object in the virtual environment to a server;

receiving a sound effect display instruction from the server; and displaying a sound effect indication pattern in the virtual environment according to the sound effect display instruction using the first virtual object as a center, the sound effect indication pattern indicating that a second virtual object in a predetermined behavior state exists in a location region that is negatively correlated with a sound effect intensity in a first orientation of the first virtual object; and wherein the sound effect display instruction is transmitted by the server subsequent to obtaining the sound effect intensity, the sound effect intensity is obtained by the server according to a first distance between the first virtual object and the second virtual object, the first distance is calculated by the server according to the first coordinate and a second coordinate of the second virtual object in the first orientation, the second coordinate is obtained according to the first coordinate According to one aspect, an embodiment of this disclosure provides an information display method in a virtual environment, including:

displaying a first display picture of the virtual environment observed from a first viewing angle, the first display picture displaying an object model of a first virtual object; and in response to a second virtual object in a predetermined behavior state existing in a first orientation of the first virtual object in the virtual environment, displaying a sound effect indication pattern using the first virtual object as a center, the sound effect indication pattern pointing to a direction of a location of the second virtual object.

According to one aspect, an embodiment of this disclosure provides an information display apparatus in a virtual environment, including:

an obtaining module, configured to obtain first coordinate of a first virtual object in the virtual environment; and obtain, according to the first coordinate, second coordinate of a second virtual object located in a first orientation of the first virtual object and in a predetermined behavior state;

a processing module, configured to calculate a first distance between the first virtual object and the second virtual object according to the first coordinate and the second coordinate; and obtain a sound effect intensity of the second virtual object in the first orientation according to the first distance; and a transmission module, configured to transmit a sound effect display instruction to a first terminal corresponding to the first virtual object, the sound effect display instruction being used for instructing the first terminal to display a sound effect indication pattern using the first virtual object as a center in the virtual environment, and the sound effect indication pattern being used for indicating that the second virtual object exists in a location region that is negatively correlated with the sound effect intensity in the first orientation.

According to one aspect, an embodiment of this disclosure provides an information display apparatus in a virtual environment, including:

a transmission module, configured to transmit first coordinate of a first virtual object in the virtual environment to a server;

a receiving module, configured to receive a sound effect display instruction transmitted by the server; and a display module, configured to display a sound effect indication pattern in the virtual environment according to the sound effect display instruction using the first virtual object as a center, the sound effect indication pattern being used for indicating that a second virtual object in a predetermined behavior state exists in a location region that is negatively correlated with a sound effect intensity in a first orientation of the first virtual object; and the sound effect display instruction being an instruction transmitted by the server after obtaining the sound effect intensity, the sound effect intensity being obtained by the server according to a first distance between the first virtual object and the second virtual object, and the first distance being obtained by the server, after obtaining second coordinate of the second virtual object in the first orientation according to the first coordinate, through calculation according to the first coordinate and the second coordinate.

According to one aspect, an embodiment of this disclosure provides an electronic device, including a processor and a memory, the memory storing at least one instruction, and the at least one instruction being loaded and executed by the processor to implement the foregoing information display method in a virtual environment.

According to one aspect, an embodiment of this disclosure provides a computer-readable storage medium, storing at least one instruction, the at least one instruction being loaded and executed by a processor to implement the foregoing information display method in a virtual environment.

BRIEF DESCRIPTION OF THE DRAWINGS

To describe the technical solutions of the embodiments of this disclosure more clearly, the following briefly introduces the accompanying drawings required for describing the embodiments. Apparently, the accompanying drawings in the following description show only some embodiments of this disclosure, and a person of ordinary skill in the art may still derive other drawings from the accompanying drawings without creative efforts.

FIG. 12 is a schematic diagram of a predetermined distance range according to an exemplary embodiment of this disclosure.

FIG. 13 is a method flowchart of an information display method in a virtual environment according to an exemplary embodiment of this disclosure.

DESCRIPTION OF EMBODIMENTS

Figure 1:
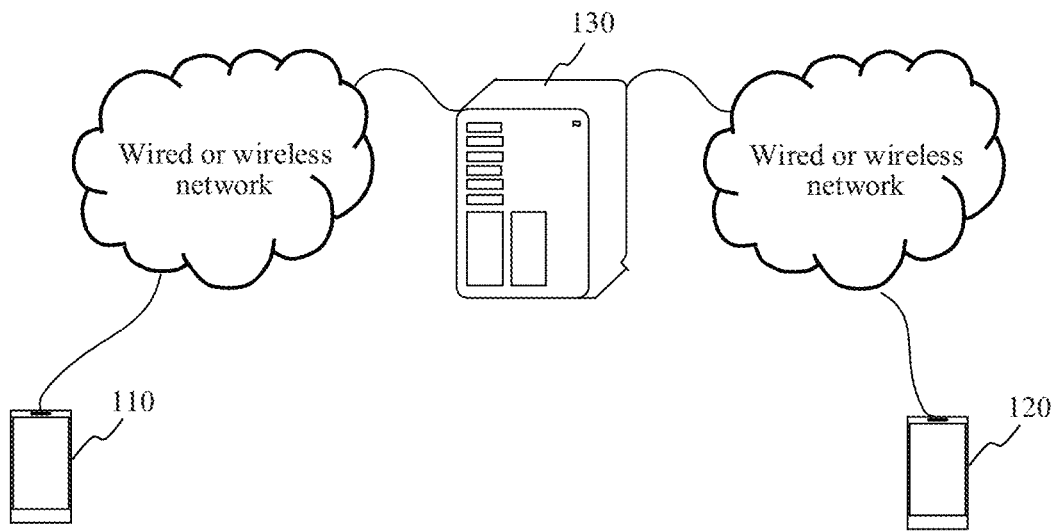
FIG. 1 is a schematic diagram of an implementation environment of an information display method in a virtual environment according to an exemplary embodiment of this disclosure.

To make the objectives, technical solutions, and advantages of this disclosure clearer, the following further describes the implementations of this disclosure in detail with reference to the accompanying drawings.

First, terms involved in the embodiments of this disclosure are explained.

Virtual environment: a virtual environment provided when an application program is running on a terminal. The virtual environment may be a simulated environment of a real world, may be a semi-simulated semi-fictional environment, or may be an entirely fictional environment. The virtual environment may be a two-dimensional virtual environment, or may be a three-dimensional virtual environment.

Virtual object: a movable object in a virtual environment. The movable object may be a virtual character, a virtual animal, or a cartoon character. Optionally, the virtual object is a three-dimensional model created based on a skeletal animation technology. Each virtual object has a shape and a volume in the virtual environment, and occupies some space in the virtual environment.

Oblique view: a viewing angle of observing a virtual environment at an overlooking angle. For example, generally, in a multiplayer online battle arena game, the virtual environment is observed at a 45° overlooking angle, and a camera for observation is located above the virtual environment, to observe the virtual environment at an overlooking angle.

Coordinate: coordinate values of a reference point of each virtual object in a virtual environment, and the reference point may be a predetermined pixel point on the head, a shoulder, a foot, or the chest of the virtual object. For example, in a case that the virtual environment is a two-dimensional virtual environment, the coordinate of the virtual object is (X, Y), where X represents a horizontal coordinate of the virtual object in the virtual environment, and Y represents a vertical coordinate of the virtual object in the virtual environment; and in a case that the virtual environment is a three-dimensional virtual environment, the coordinate of the virtual object is (X, Y, Z), where X generally represents a coordinate in an east-west direction of a ground plane of the virtual environment, Y generally represents a coordinate in a south-north direction of the ground plane of the virtual environment, and Z generally represents a coordinate in a vertical direction of the ground plane of the virtual environment.

Sound effect indication pattern: a pattern obtained by picturizing a sound effect near the virtual object (for example, on the surrounding ground) using a virtual object as a center. For example, the sound effect indication pattern may be an abstracted waveform picture.

In the related art, a terminal plays sound effects of all virtual objects in the same virtual environment simultaneously, and a user cannot determine a distance between each two virtual objects according to the sound effects of the virtual objects, leading to relatively poor trueness of the virtual environment. According to the technical solutions provided in the embodiments of this disclosure, a coordinate of a second virtual object in a first orientation of a first virtual object is obtained, a first distance between the first virtual object and the second virtual object is calculated, a sound effect intensity is determined according to the first distance, and a sound effect indication pattern is displayed according to the sound effect intensity using the first virtual object as a center. Because the sound effect indication pattern is for indicating that the second virtual object exists in a location region that is negatively correlated with the sound effect intensity, the distance between the second virtual object and the first virtual object can be intuitively displayed, thereby improving the trueness of the virtual environment.

FIG. 1 shows a schematic diagram of an implementation environment of an information display method in a virtual environment according to an exemplary embodiment of this disclosure. As shown in FIG. 1, the implementation environment includes a first terminal 110, a second terminal 120, and a server 130. The first terminal 110 is communicatively connected to the server 130 using a wired or wireless network, and the second terminal 120 is communicatively connected to the server 130 using a wired or wireless network. In this embodiment of this disclosure, the server 130 is communicatively connected to at least two terminals, and the first terminal 110 and the second terminal 120 refer to the at least two terminals in the accompanying drawing.

A user controls a first virtual object in the virtual environment using the first terminal 110, and the first terminal 110 transmits a first behavior state and a first coordinate of the first virtual object to the server.

The user controls a second virtual object in the virtual environment using the second terminal 120, and the second terminal 120 transmits a second behavior state and a second coordinate of the second virtual object to the server.

The server 130 detects, according to the first coordinate, whether the second behavior state of the second virtual object in a first orientation of the first virtual object is a predetermined behavior state, and if the second behavior state is the predetermined behavior state, the server calculates a first distance between the first virtual object and the second virtual object according to the first coordinate and the second coordinate; obtains a sound effect intensity of the second virtual object in the first orientation according to the first distance; and transmits a sound effect display instruction to the first terminal 110.

The terminal 110 receives the sound effect display instruction from the server 130, and displays a sound effect indication pattern in the virtual environment according to the sound effect display instruction using the first virtual object as a center, the sound effect indication pattern being for indicating that the second virtual object exists in a location region that is negatively correlated with the sound effect intensity in the first orientation.

For example, the virtual environment may be a multiplayer online battle arena game under an oblique view, the first virtual object is a first heroic character controlled by a first player in the multiplayer online battle arena game, and the second virtual object is a second heroic character controlled by a second player in the multiplayer online battle arena game. When the second heroic character gets close to the first heroic character, a sound effect indication pattern is displayed using the first heroic character as a center, where the sound effect indication pattern points to a location of the second heroic character, and at least one of a size, an area, an outline width, or a quantity of grains of the sound effect indication pattern is positively correlated with a distance between the first heroic character and the second heroic character.

Figure 2:
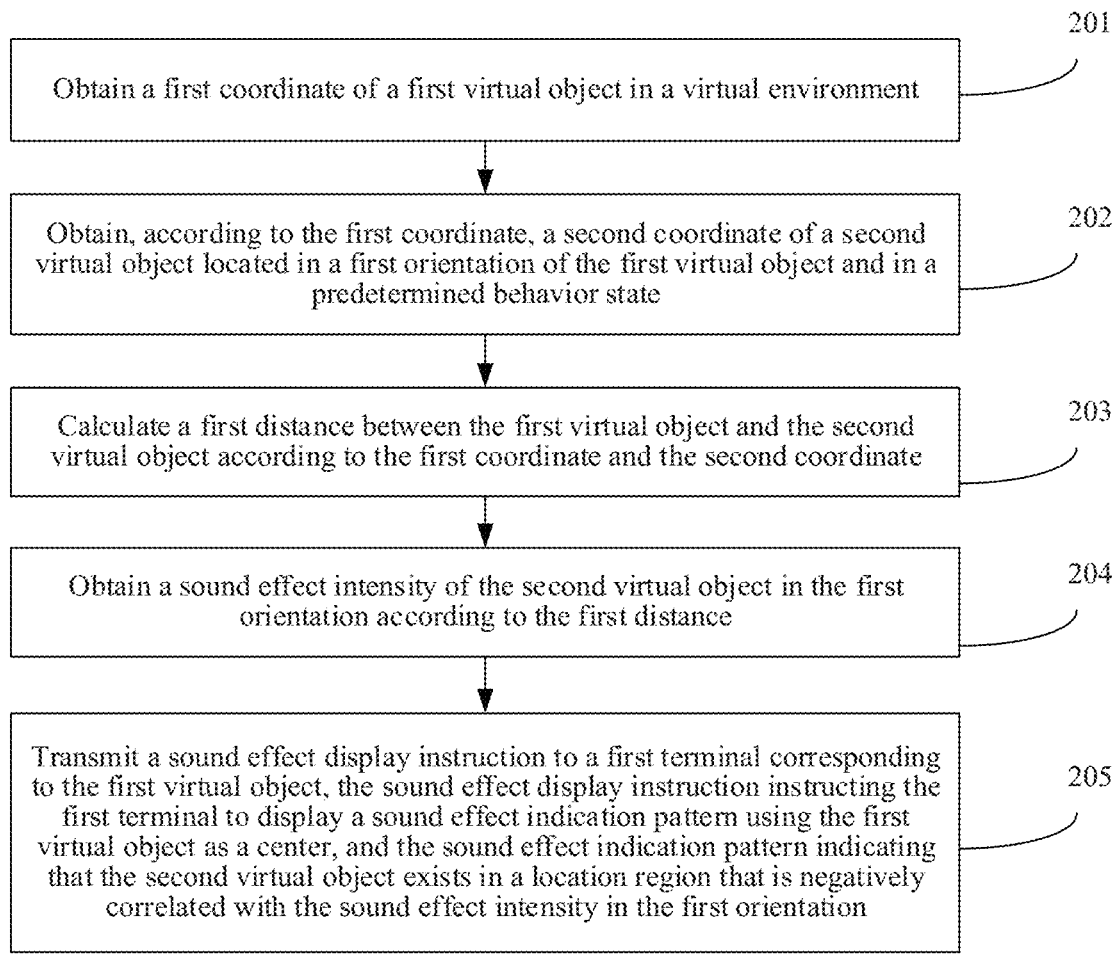
FIG. 2 is a method flowchart of an information display method in a virtual environment according to an exemplary embodiment of this disclosure.

FIG. 2 shows a method flowchart of an information display method in a virtual environment according to an exemplary embodiment of this disclosure. The method may be applied to the server 130 in the implementation environment shown in FIG. 1, and the method includes:

Step 201: Obtain a first coordinate of a first virtual object in the virtual environment.

A first terminal corresponding to a first virtual object transmits a first behavior state of the first virtual object and first coordinate of the first virtual object in the virtual environment to a server, and the server receives the first behavior state and the first coordinate.

For example, the first terminal transmits the first behavior state and the first coordinate to the server every predetermined time interval; or the first terminal transmits the first behavior state and the first coordinate to the server in a case of determining that the first behavior state is changed.

Step 202: Obtain, according to the first coordinate, a second coordinate of a second virtual object located in a first orientation of the first virtual object and in a predetermined behavior state.

The server detects, according to the first coordinate, whether a second virtual object in a predetermined behavior state exists in a first orientation of the first virtual object, and obtains, if the second virtual object in the predetermined behavior state exists in the first orientation, a second coordinate of the second virtual object. The behavior state of the second virtual object is transmitted to the server by a second terminal corresponding to the second virtual object.

Figure 3:
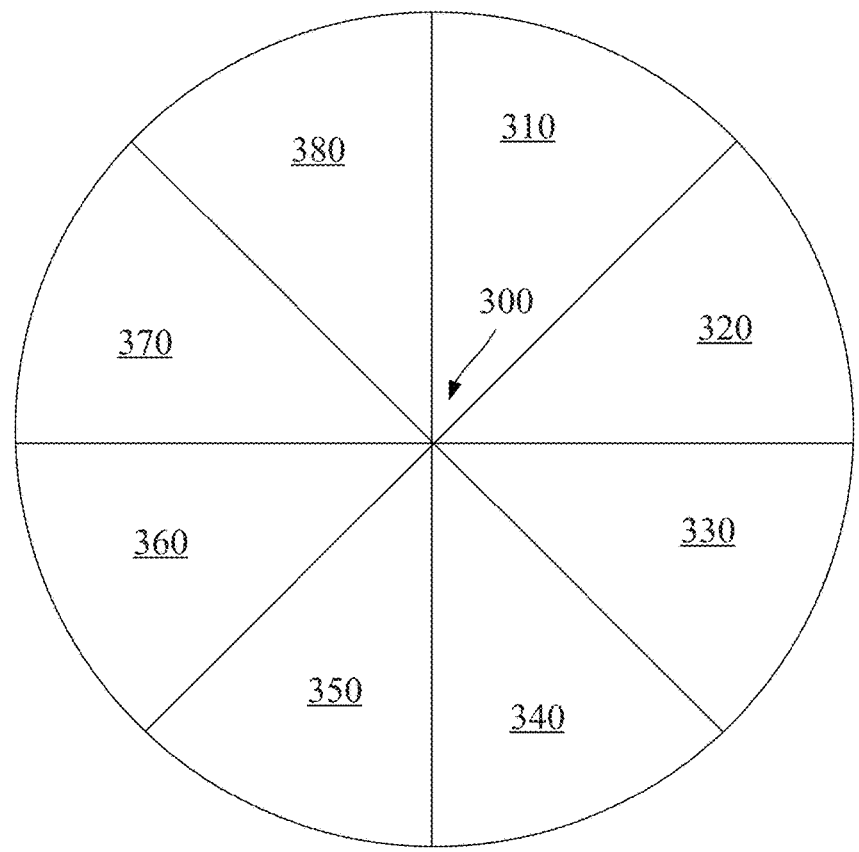
FIG. 3 is a schematic diagram of calibration directions of a virtual object according to an exemplary embodiment of this disclosure.

For example, as shown in FIG. 3, the server determines a circular detection region using the first coordinate 300 as a center of a circle and a predetermined distance as a radius, and divides the detection region into a plurality of regions

310, 320, 330, 340, 350, 360, 370, and 380 with the same area using straight lines passing through the first coordinate, where each region is an orientation, and the first orientation is any one of the plurality of regions. For example, the first orientation is the region 310, the server detects whether a second virtual object in a predetermined behavior state exists in the region 310, and obtains, if the second virtual object in the predetermined behavior state exists in the region 310, second coordinate of the second virtual object.

Optionally, when the server determines that the second virtual object in the predetermined behavior state exists in the first orientation, and the first virtual object and the second virtual object belong to different camps, the server performs the step of obtaining the second coordinate.

The server determines whether the first virtual object and the second virtual object belong to the same camp, and performs, if the first virtual object and the second virtual object belong to the same camp, the step of obtaining the second coordinate; and if the first virtual object and the second virtual object belong to different camps, the step is stopped.

For example, the camp refers to a team to which a hero controlled by a player belongs in the multiplayer online battle arena game. For example, if the first heroic character belongs to a red team, the second heroic character belongs to a blue team, and the red team and the blue team are hostile to each other, the first heroic character and the second heroic character belong to different camps; if the first heroic character belongs to a red team, the second heroic character belongs to a yellow team, and the red team is in alliance with the yellow team, the first heroic character and the second heroic character belong to the same camp; and if the first heroic character and the second heroic character both belong to a red team, the first heroic character and the second heroic character belong to the same camp.

For example, the predetermined behavior state is a behavior state of a virtual object predetermined in a terminal. For example, the predetermined behavior state includes at least one of moving, attacking, or spell casting of the virtual object.

Step 203: Calculate a first distance between the first virtual object and the second virtual object according to the first coordinate and the second coordinate.

For example, in a two-dimensional virtual environment, the first coordinate is (X1, Y1), the second coordinate is (X2, Y2), and the server performs calculation according to the first coordinate and the second coordinate to learn that a first distance between the first virtual object and the second virtual object is $\sqrt{(X1-X2)^2+(Y1-Y2)^2}$.

For example, in a three-dimensional virtual environment, the first coordinate is (X1, Y1, Z1), the second coordinate is (X2, Y2, Z2), and the server performs calculation according to the first coordinate and the second coordinate to learn that a first distance between the first virtual object and the second virtual object is $\sqrt[3]{(X1-X2)^3+(Y1-Y2)^3+(Z1-Z2)^3}$.

Step 204: Obtain a sound effect intensity of the second virtual object in the first orientation according to the first distance.

The server obtains a sound effect intensity of the second virtual object in the first orientation according to the first distance. The sound effect intensity is used for indicating an intensity of a sound effect applied by the predetermined behavior state of the second virtual object to the first virtual object, and the sound effect intensity is in inverse proportion to the first distance. The smaller the first distance is, that is, the closer the second virtual object and the first virtual object are to each other, the larger the sound effect intensity is; and the larger the first distance is, that is, the farther the second virtual object and the first virtual object are from each other, the smaller the sound effect intensity is. For example, when the predetermined behavior state is moving, the second virtual object generates a sound of footsteps in a moving process. The smaller the first distance between the second virtual object and the first virtual object is, the larger the sound effect intensity generated by the sound of footsteps is; and the larger the first distance between the second virtual object and the first virtual object is, the smaller the sound effect intensity generated by the sound of footsteps is.

For example, a first correspondence between distances and sound effect intensities is stored in the server, and the server may obtain a sound effect intensity corresponding to the first distance by querying the first correspondence according to the first distance.

Step 205: Transmit a sound effect display instruction to a first terminal corresponding to the first virtual object.

After obtaining the sound effect intensity, the server transmits a sound effect display instruction to the first terminal, where the sound effect display instruction carries the sound effect intensity.

After receiving the sound effect display instruction, the first terminal displays a sound effect indication pattern using the first virtual object as a center, the sound effect indication pattern indicating that the second virtual object exists in a location region that is negatively correlated with the sound effect intensity in the first orientation.

Optionally, the sound effect display instruction includes the sound effect intensity, and the first terminal determines a pattern parameter of the sound effect indication pattern according to the sound effect intensity, the pattern parameter including at least one of a size, an area, an outline width, or a quantity of grains.

For example, a second correspondence between sound effect intensities and pattern parameters is preconfigured in the first terminal, and the first terminal queries the second correspondence according to the sound effect intensity, to determine the pattern parameter of the sound effect indication pattern.

Figure 4:
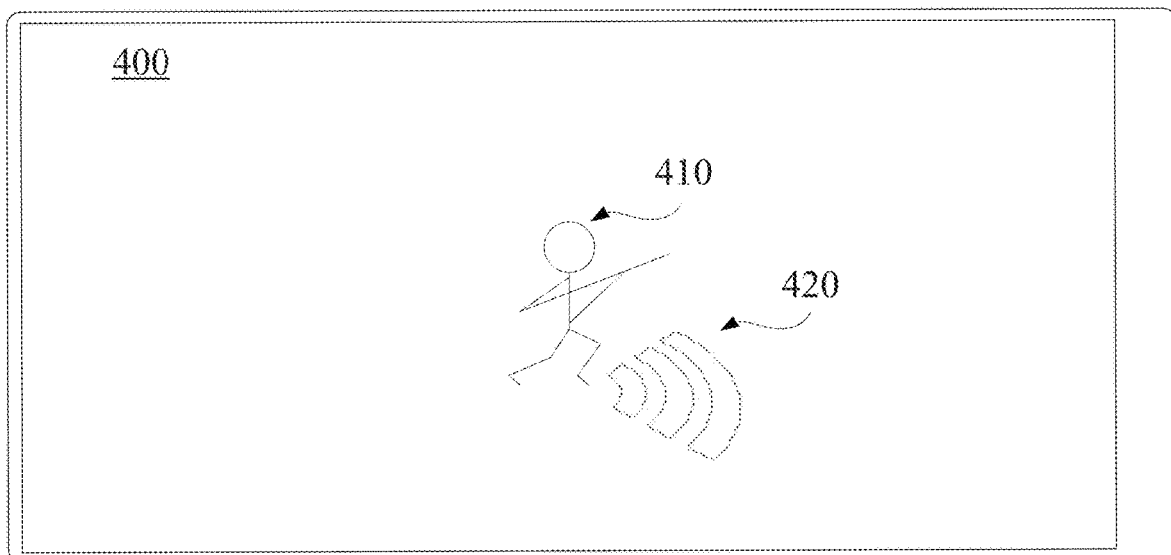
FIG. 4 is a schematic diagram of a sound effect indication pattern according to an exemplary embodiment of this disclosure.

As shown in FIG. 4, when the sound effect intensity is a first intensity, the first terminal displays a sound effect indication pattern 420 using a first virtual object 410 as a center in a virtual environment 400, where a pattern parameter of the sound effect indication pattern is a broad outline, and the pattern parameter is a pattern parameter corresponding to the first intensity.

Figure 5:
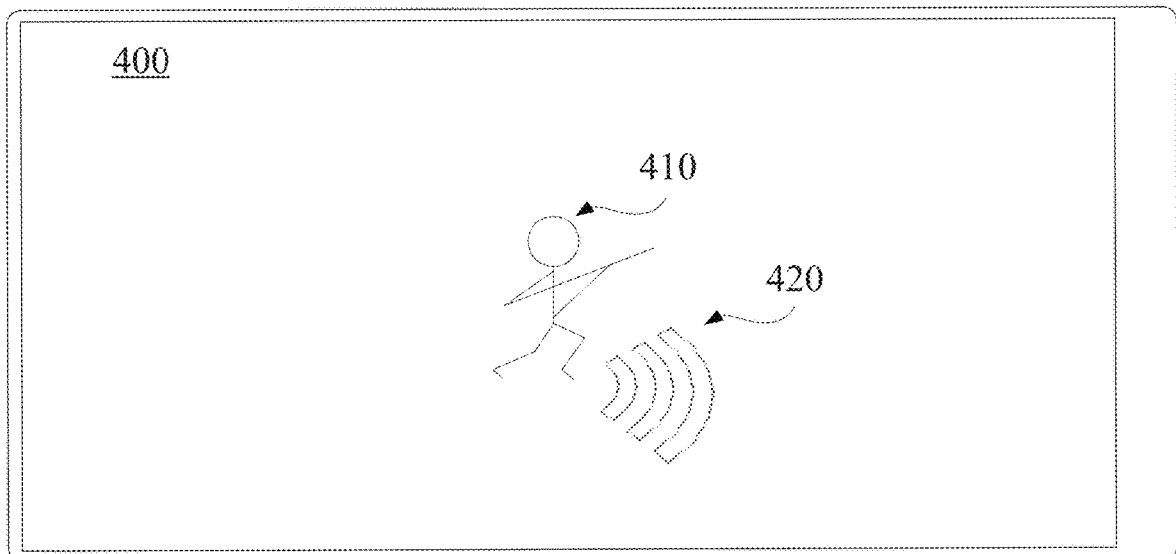
FIG. 5 is a schematic diagram of a sound effect indication pattern according to an exemplary embodiment of this disclosure.

As shown in FIG. 5, when the sound effect intensity is a second intensity, the first terminal displays the sound effect indication pattern 420 using the first virtual object 410 as a center in the virtual environment 400, where a pattern parameter of the sound effect indication pattern is a midsize outline, and the pattern parameter is a pattern parameter corresponding to the second intensity.

Figure 6:
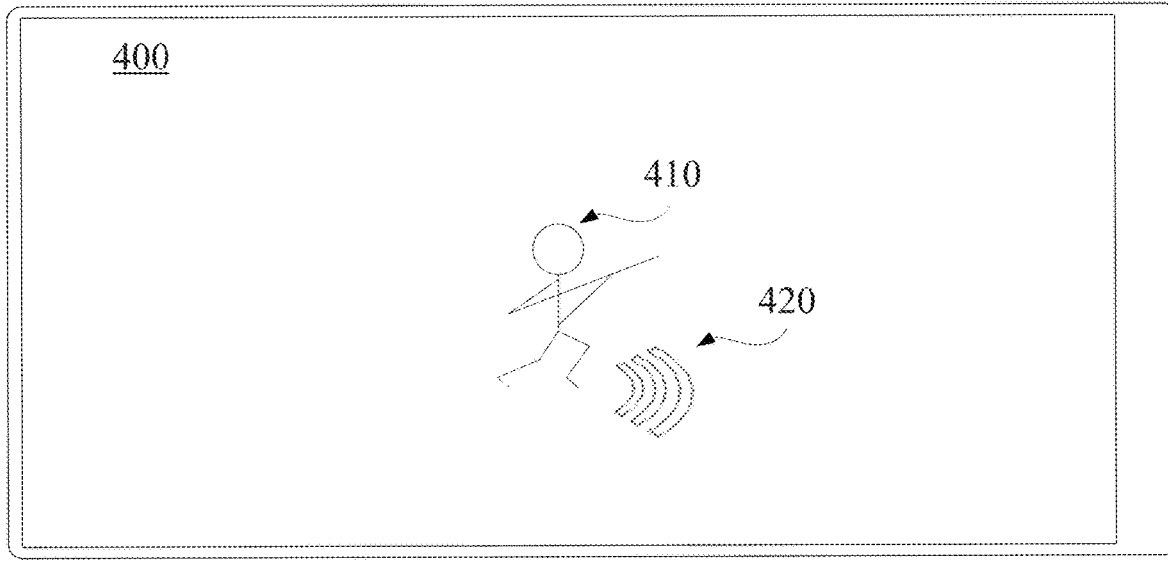
FIG. 6 is a schematic diagram of a sound effect indication pattern according to an exemplary embodiment of this disclosure.

As shown in FIG. 6, when the sound effect intensity is a third intensity, the first terminal displays the sound effect indication pattern 420 using the first virtual object 410 as a center in the virtual environment 400, where a pattern parameter of the sound effect indication pattern is a narrow outline, and the pattern parameter is a pattern parameter corresponding to the third intensity.

Optionally, the sound effect display instruction further carries the predetermined behavior state of the second virtual object, to enable the first terminal to determine the pattern parameter of the sound effect indication pattern according to the predetermined behavior state.

For example, a third correspondence between predetermined behavior states and pattern types is preconfigured in the first terminal, and the first terminal queries the third correspondence according to the predetermined behavior state, to determine a pattern type of the sound effect indication pattern.

After receiving the sound effect display instruction, the first terminal determines the pattern type of the sound effect indication pattern according to the predetermined behavior state, and/or determines the pattern parameter of the sound effect indication pattern according to the sound effect intensity, the pattern parameter including at least one of a size, an area, an outline width, or a quantity of grains.

Figure 7:
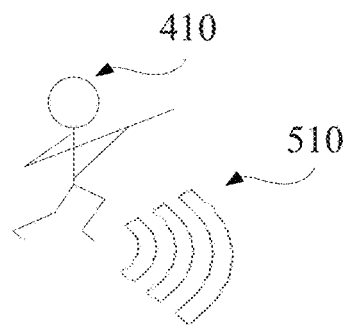
FIG. 7 is a schematic diagram of a sound effect indication pattern according to an exemplary embodiment of this disclosure.

For example, as shown in FIG. 7, when the predetermined behavior state is moving and the sound effect intensity is the first intensity, the pattern type corresponding to moving is a waveform pattern, and the pattern parameter corresponding to the first intensity is a broad outline width, so that a sound effect indication pattern 510 displayed by the first terminal using the first virtual object 410 as a center in a virtual environment 500 is a waveform pattern, and the outline width of the waveform pattern is broad.

Figure 8:
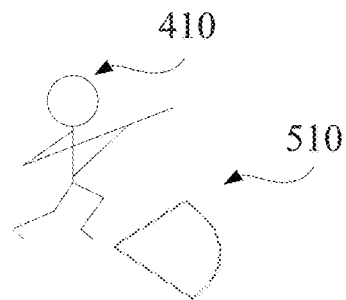
FIG. 8 is a schematic diagram of a sound effect indication pattern according to an exemplary embodiment of this disclosure.

As shown in FIG. 8, when the predetermined behavior state is spell casting and the sound effect intensity is the second intensity, the pattern type corresponding to spell casting is a fan-shaped pattern, and the pattern parameter corresponding to the second intensity is a narrow outline width, so that the sound effect indication pattern 510 displayed by the first terminal using the first virtual object 410 as a center in the virtual environment 500 is a fan-shaped pattern, and the outline width of the fan-shaped pattern is narrow.

Based on the above, in this embodiment of this disclosure, a coordinate of the second virtual object in the first orientation of the first virtual object is obtained, the first distance between the first virtual object and the second virtual object is calculated, the sound effect intensity is determined according to the first distance, and the sound effect indication pattern is displayed according to the sound effect intensity using the first virtual object as a center. Because the sound effect indication pattern is for indicating that the second virtual object exists in a location region that is negatively correlated with the sound effect intensity, the distance between the second virtual object and the first virtual object can be intuitively displayed, thereby improving the trueness of the virtual environment.

Optionally, in this embodiment of this disclosure, whether the first virtual object and the second virtual object belong to the same camp is determined, and in a case that the first virtual object and the second virtual object belong to different camps, the step of obtaining the second coordinate is performed, to resolve a problem that when the first terminal displays the sound effect indication pattern using the first virtual object as a center in the virtual environment, the sound effect indication pattern of the second virtual object belonging to the same camp as the first virtual object is displayed, causing interference to the user, thereby improving the information display efficiency in the virtual environment.

Figure 9:
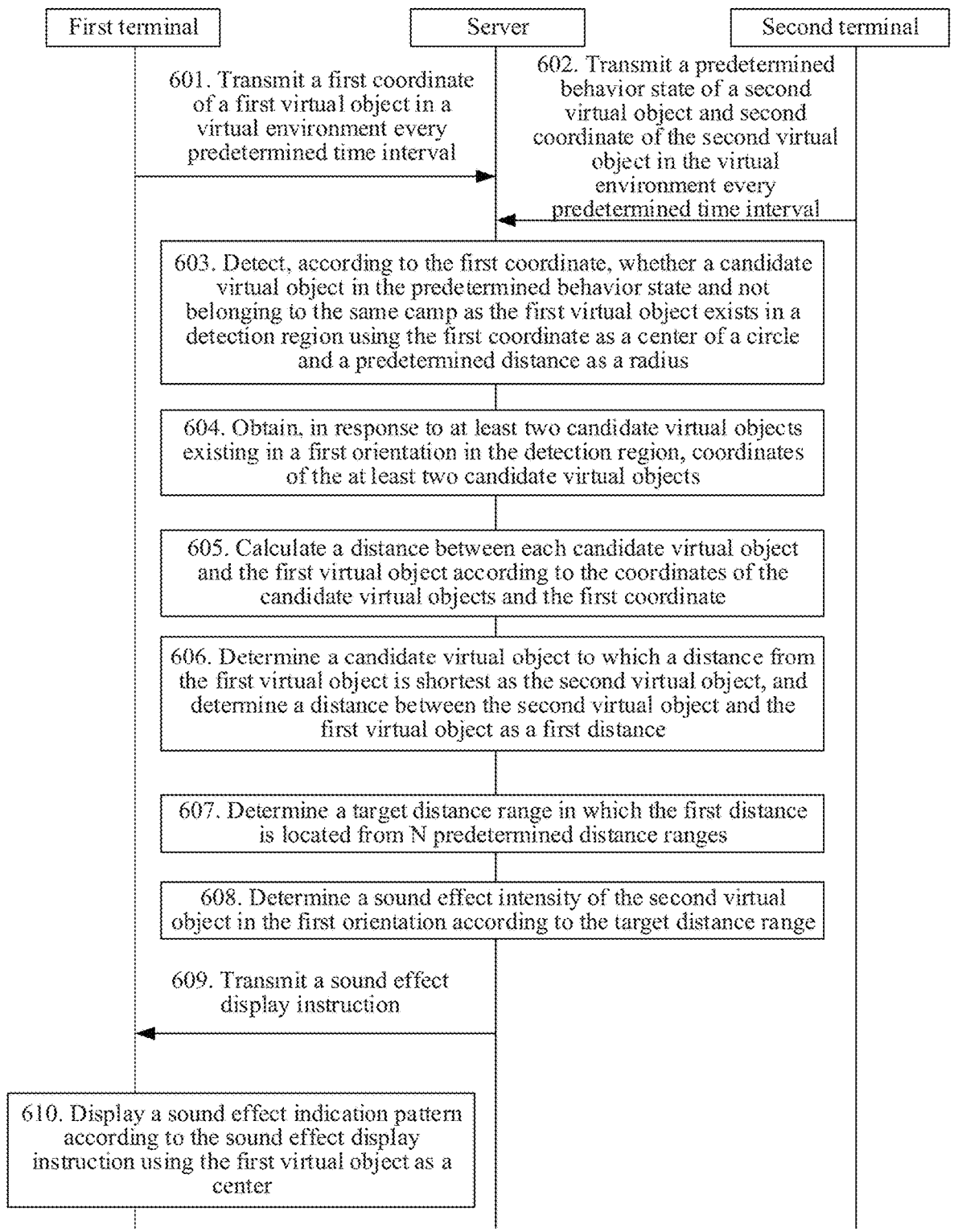
FIG. 9 is a method flowchart of an information display method in a virtual environment according to an exemplary embodiment of this disclosure.

FIG. 9 shows a method flowchart of an information display method in a virtual environment according to an exemplary embodiment of this disclosure. The method may be applied to the implementation environment shown in FIG. 1, and the method includes:

Step 601: A first terminal transmits first coordinate of a first virtual object in the virtual environment to a server every predetermined time interval.

The first terminal transmits the first coordinate of the first virtual object in the virtual environment to the server every predetermined time interval using a wired or wireless network.

Optionally, the first terminal detects whether the first virtual object is in a predetermined behavior state, and when the first virtual object is in the predetermined behavior state, the first terminal transmits the predetermined behavior state and the first coordinate of the first virtual object to the server; and when the first virtual object is not in the predetermined behavior state, the first terminal transmits the first coordinate to the server.

Step 602: A second terminal transmits a predetermined behavior state of a second virtual object and the second coordinate of the second virtual object in the virtual environment to the server every predetermined time interval.

The second terminal detects whether the second virtual object is in the predetermined behavior state, and when the second virtual object is in the predetermined behavior state, the second terminal transmits the predetermined behavior state of the second virtual object and the second coordinate of the second virtual object in the virtual environment to the server every predetermined time interval using a wired or wireless network; and when the second virtual object is not in the predetermined behavior state, the second terminal transmits the second coordinate to the server.

Step 603: The server detects, according to the first coordinate, whether a candidate virtual object in the predetermined behavior state and not belonging to the same camp as the first virtual object exists in a detection region using the first coordinate as a center of a circle and a predetermined distance as a radius.

The server detects, according to the first coordinate, whether a candidate virtual object exists in a detection region using the first coordinate as a center of a circle and a predetermined distance as a radius. The candidate virtual object is a virtual object in the predetermined behavior state and not belonging to the same camp as the first virtual object.

Figure 10:
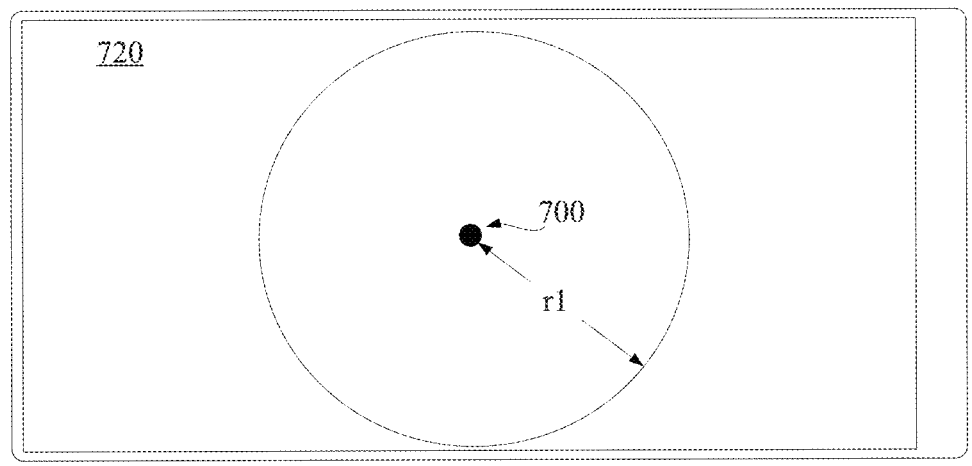
FIG. 10 is a schematic diagram of a predetermined distance range according to an exemplary embodiment of this disclosure.
Figure 11:
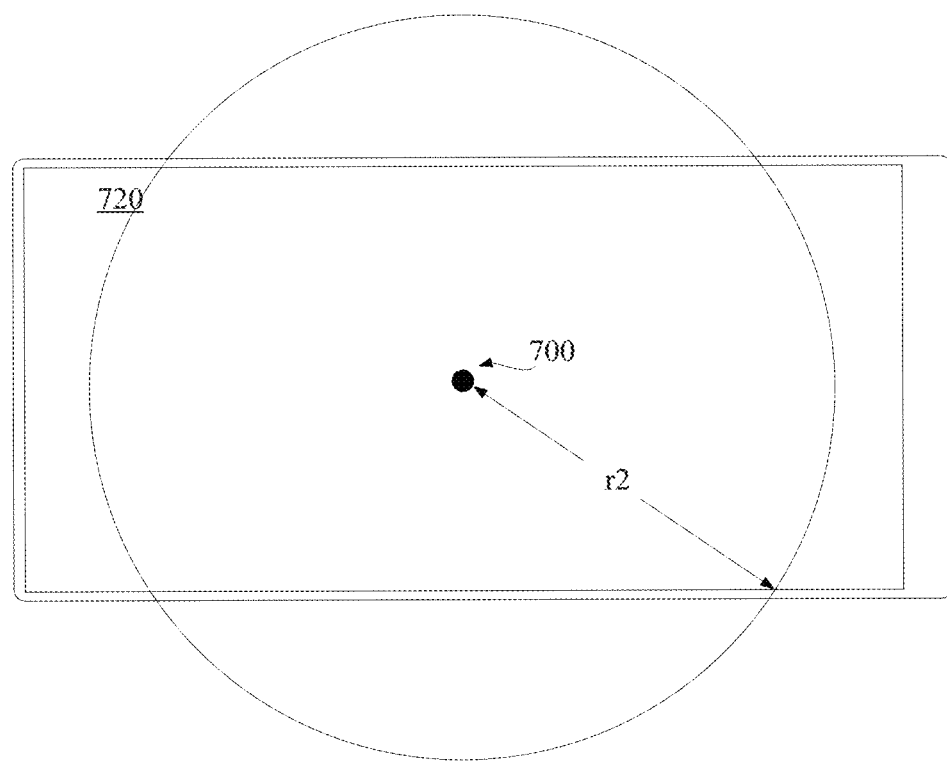
FIG. 11 is a schematic diagram of a predetermined distance range according to an exemplary embodiment of this disclosure.

The predetermined distance may be set according to a requirement. For example, as shown in FIG. 10, a detection region 710 using the first coordinate 700 as a center of a circle and a predetermined distance r1 as a radius is entirely located in a display region 720 of the virtual environment, and the detection region 710 does not cover all of the display region 720; as shown in FIG. 11, a detection region 710 using the first coordinate 700 as a center of a circle and a predetermined distance r2 as a radius is partially located in the display region 720 of the virtual environment, and the detection region 710 does not cover all of the display region 720; and as shown in FIG. 12, a detection region 710 using the first coordinate 700 as a center of a circle and a predetermined distance r3 as a radius is partially located in the display region 720 of the virtual environment, and the detection region 710 covers all of the display region 720.

Step 604: The server obtains, in a case that at least two candidate virtual objects exist in a first orientation in the detection region, coordinates of the at least two candidate virtual objects.

The server obtains, in a case of detecting that at least two candidate virtual objects exist in the first orientation of the first coordinate, coordinates of the at least two candidate virtual objects. The coordinate of the candidate virtual object is transmitted to the server by a terminal corresponding to the candidate virtual object using a wired or wireless network.

Step 605: The server calculates a distance between each candidate virtual object and the first virtual object according to the coordinates of the candidate virtual objects and the first coordinate.

The server calculates distances between the at least two candidate virtual objects and the first virtual object according to the coordinate of the at least two candidate virtual objects and the first coordinate of the first virtual object. For a method for calculating, by the server, the distance between the candidate virtual object and the first virtual object, reference may be made to step 203 in the embodiment of FIG. 2, and details are not described herein again.

Step 606: The server determines a candidate virtual object to which a distance from the first virtual object is smallest as the second virtual object, and determines a distance between the second virtual object and the first virtual object as a first distance.

The server determines, according to the distances obtained through calculation, the candidate virtual object to which a distance from the first virtual object is smallest as the second virtual object, and determines the distance between the second virtual object and the first virtual object as the first distance.

Step 607: The server determines a target distance range in which the first distance is located from N predetermined distance ranges.

The server determines a target distance range in which the first distance is located among N predetermined distance ranges. The N predetermined distance ranges are distance value ranges adjacent to each other in an end-to-end manner and not overlapping with each other, where N is a natural number, and N≥2.

For example, the first distance is 7100 distance units, and three predetermined distance ranges connected to each other in an end-to-end manner are stored in the server, and are respectively a first distance range (0 distance unit to 7000 distance units), a second distance range (7000 distance units to 13999 distance units), and a third distance range (13999 distance units to 21000 distance units). The server determines that the first distance belongs to the second distance range, so that the second distance range is the target distance range.

Step 608: The server determines a sound effect intensity of the second virtual object in the first orientation according to the target distance range.

The server determines the sound effect intensity of the second virtual object in the first orientation according to the target distance range in which the first distance is located among the N predetermined distance ranges.

For example, the predetermined distance ranges include two distance ranges, where a first predetermined distance range is from 0 to a first distance threshold, and a second predetermined distance range is from the first distance threshold to a predetermined distance. The server first determines, according to the first distance, whether the first distance is less than the first distance threshold. If the first distance is less than the first distance threshold, the first distance falls within the first predetermined distance range, and the server determines that the sound effect intensity of the second virtual object in the first orientation is a first intensity; and if the first distance is not less than the first distance threshold, the first distance falls within the second predetermined distance range, and the server determines that the sound effect intensity of the second virtual object in the first orientation is a second intensity, where the first intensity is greater than the second intensity.

For example, the predetermined distance range includes three distance ranges, where a first predetermined distance range is from 0 to a first distance threshold, a second predetermined distance range is from the first distance threshold to a second distance threshold, and a third predetermined distance range is from the second distance threshold to a predetermined distance. The server first determines, according to the first distance, whether the first distance is less than the first distance threshold. If the first distance is less than the first distance threshold, the first distance falls within the first predetermined distance range, and the server determines that the sound effect intensity of the second virtual object in the first orientation is a first intensity; and if the first distance is not less than the first distance threshold, the server determines whether the first distance is less than the second distance threshold. If the first distance is less than the second distance threshold, the first distance falls within the second predetermined distance range, and the server determines that the sound effect intensity of the second virtual object in the first orientation is a second intensity; and if the first distance is not less than the second distance threshold, the first distance falls within the third predetermined distance range, and the server determines that the sound effect intensity of the second virtual object in the first orientation is a third intensity, where the first intensity is greater than the second intensity, and the second intensity is greater than the third intensity.

For example, three predetermined distance ranges connected to each other in an end-to-end manner are stored in the server, and are respectively a first distance range (0 distance unit to 7000 distance units), a second distance range (7000 distance units to 13999 distance units), and a third distance range (13999 distance units to 21000 distance units). After obtaining the first distance through calculation, the server first determines whether the first distance is within the first distance range. If the first distance is within the first distance range, the server determines that the sound effect intensity of the second virtual object in the first orientation is strong; and if the first distance is not within the first distance range, the server determines whether the first distance is within the second distance range. If the first distance is within the second distance range, the server determines that the sound effect intensity of the second virtual object in the first orientation is moderate; and if the first distance is not within the second distance range, the server determines whether the first distance is within the third distance range. If the first distance is within the third distance range, the server determines that the sound effect intensity of the second virtual object in the first orientation is weak; and if the first distance exceeds the third distance range, the server deletes all coordinates participating in the calculation.

Step 609: The server transmits a sound effect display instruction to the first terminal.

The server transmits a sound effect display instruction to the first terminal, where the sound effect display instruction carries the first orientation and the sound effect intensity. Optionally, the sound effect display instruction further carries the predetermined behavior state.

Step 610: The first terminal displays a sound effect indication pattern according to the sound effect display instruction using the first virtual object as a center.

After receiving the sound effect display instruction, the first terminal determines a pattern parameter of the sound effect indication pattern according to the sound effect intensity, the pattern parameter including at least one of a size, an area, an outline width, and a quantity of grains; and selects, according to the first orientation, a sound effect indication pattern corresponding to the first orientation from M sound effect indication patterns with different orientations.

For example, a second correspondence between sound effect intensities and pattern parameters, and a fourth correspondence between orientations and pattern types are preconfigured in the first terminal. The first terminal determines a pattern parameter of the sound effect indication pattern according to the sound effect intensity, and determines a pattern type of the sound effect indication pattern in the first orientation according to the first orientation. After determining the pattern parameter and the sound effect indication pattern, the first terminal displays the sound effect indication pattern using the first virtual object as a center, the sound effect indication pattern being used for indicating that the second virtual object exists in a location region that is negatively correlated with the sound effect intensity in the first orientation.

For example, the first orientation is the region 310 shown in FIG. 3, and the terminal determines, according to the first orientation, that the sound effect indication pattern is a sound effect indication pattern displayed in the region 310 and the sound effect intensity is the first intensity. The terminal determines, according to the first intensity, that the pattern parameter of the sound effect indication pattern is a broad outline, and displays a sound effect indication pattern with a broad outline width in the region 310 using the first virtual object as a center.

Optionally, after receiving the sound effect display instruction, the first terminal determines the pattern type of the sound effect indication pattern according to the predetermined behavior state. For a specific implementation, reference may be made to the embodiments of FIG. 2 and FIG. 9, and details are not described herein again.

Optionally, in a case of detecting that an environment image is displayed near the first coordinate, the first terminal displays the sound effect indication pattern covering the environment image. By displaying the sound effect indication pattern covering the environment image, the sound effect indication pattern may be displayed to the user in a more highlighted manner, and interference from the environment image is avoided.

Based on the above, in this embodiment of this disclosure, a coordinate of the second virtual object in the first orientation of the first virtual object are obtained, the first distance between the first virtual object and the second virtual object is calculated, the sound effect intensity is determined according to the first distance, and the sound effect indication pattern is displayed according to the sound effect intensity using the first virtual object as a center. Because the sound effect indication pattern is indicating that the second virtual object exists in a location region that is negatively correlated with the sound effect intensity, the distance between the second virtual object and the first virtual object can be intuitively displayed, thereby improving the trueness of the virtual environment.

Optionally, in this embodiment of this disclosure, whether the first virtual object and the second virtual object belong to the same camp is determined, and in a case that the first virtual object and the second virtual object belong to different camps, the step of obtaining the second coordinate is performed, to resolve a problem that when the first terminal displays the sound effect indication pattern using the first virtual object as a center in the virtual environment, the sound effect indication pattern of the second virtual object belonging to the same camp as the first virtual object is displayed, causing interference to the user, thereby improving the information display efficiency in the virtual environment.

Optionally, in this embodiment of this disclosure, the second virtual object is determined in the candidate virtual objects, the sound effect intensity is determined according to the first distance between the second virtual object and the first virtual object, and the sound effect indication pattern is displayed according to the sound effect intensity using the first virtual object as a center, to resolve a problem that sound effect indication patterns of a plurality of candidate virtual objects are displayed in the same orientation, which causes a display mess and interferes with the user determination, thereby improving the information display efficiency in the virtual environment.

Optionally, in this embodiment of this disclosure, the first terminal selects, according to the first orientation, a sound effect indication pattern corresponding to the first orientation from the plurality of sound effect indication patterns with different orientations. Because the sound effect indication pattern is selected and determined among the sound effect indication patterns with a limited quantity of orientations, a problem that a direction to which the sound effect indication pattern points is excessively precise is resolved, thereby improving the simulation balance of the virtual environment.

FIG. 13 shows a method flowchart of an information display method in a virtual environment according to an exemplary embodiment of this disclosure. The method may be applied to the first terminal 110 in the implementation environment shown in FIG. 1, and the method includes:

Step 801: Display a first display picture of a virtual environment observed from an oblique view, the first display picture displaying an object model of a first virtual object.

Figure 14:
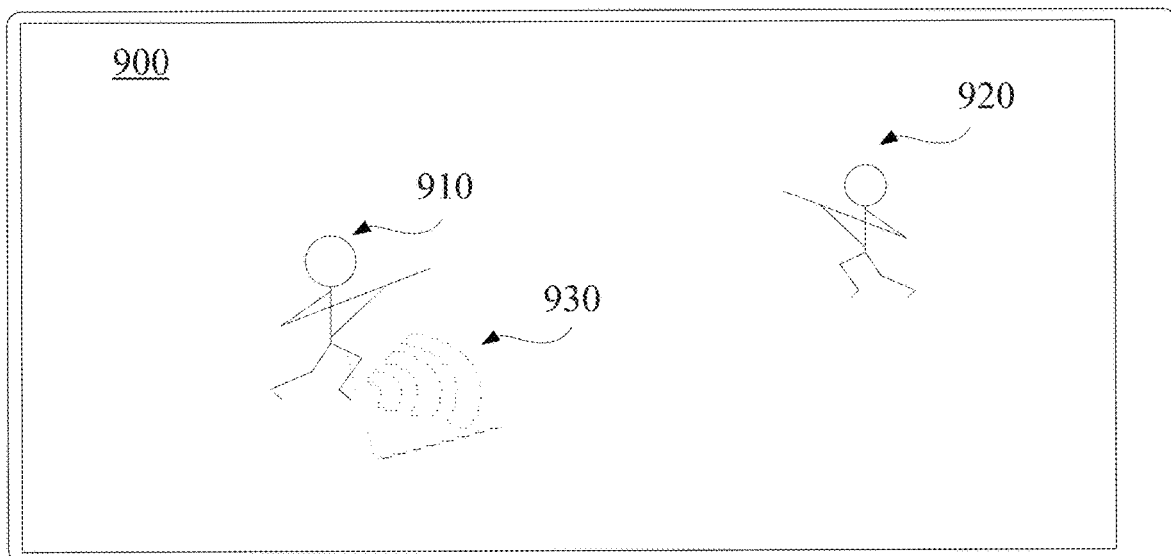
FIG. 14 is a schematic diagram of a display interface of an information display method in a virtual environment according to an exemplary embodiment of this disclosure.

For example, as shown in FIG. 14, a first display picture 900 displayed in the first terminal is a picture of a virtual environment observed from a oblique view, and an object model of a first virtual object 910 is displayed in the first display picture 900.

Step 802: Display, in a case that a second virtual object in a predetermined behavior state exists in a first orientation of the first virtual object in the virtual environment, a sound effect indication pattern using the first virtual object as a center, the sound effect indication pattern pointing to a direction of a location of the second virtual object.

For example, as shown in FIG. 14, in the virtual environment 900, in a case that a second virtual object 920 exists in a first orientation of the first virtual object 910, a sound effect indication pattern 930 is displayed using a location of the first virtual object 910 as a center, and the sound effect indication pattern 930 points to a direction of a location of the second virtual object 920. A pattern parameter of the sound effect indication pattern is determined according to a first distance R between the first virtual object 910 and the second virtual object 920, where the pattern parameter includes at least one of a size, an area, an outline width, and a quantity of grains. For calculating the first distance R between the first virtual object 910 and the second virtual object 920 to obtain a sound effect intensity, reference may be made to the descriptions in the embodiments of FIG. 2 and FIG. 9, and details are not described herein again.

For a method for determining the sound effect indication pattern, reference may be made to the embodiments of FIG. 2 and FIG. 9, and details are not described herein again.

Figure 15:
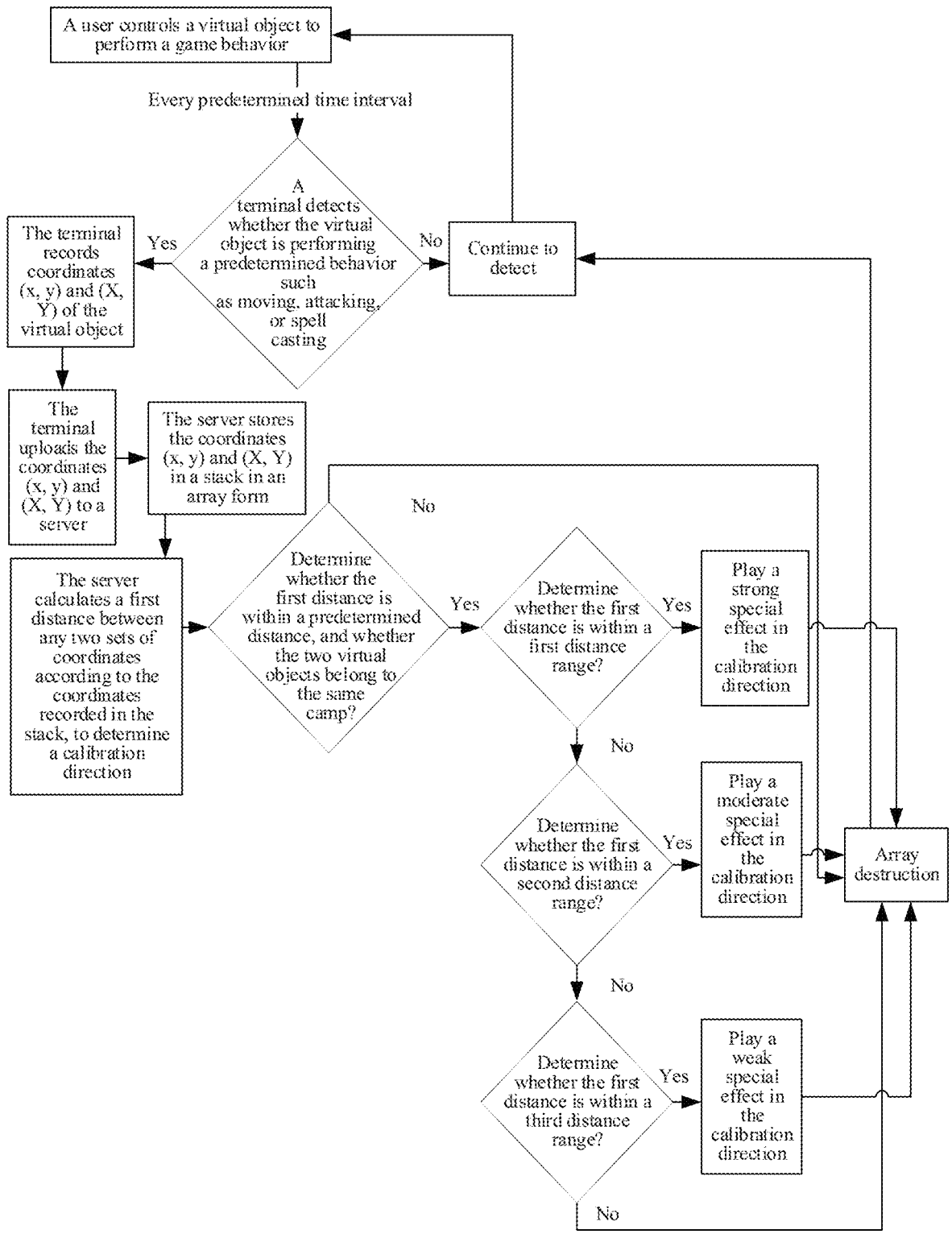
FIG. 15 is a method flowchart of an information display method in a virtual environment according to an exemplary embodiment of this disclosure.

Based on the above, in this embodiment of this disclosure, the sound effect indication pattern is displayed using the first virtual object as a center, where the sound effect indication pattern points to the direction of the location of the second virtual object. Because the pattern parameter of the sound effect indication pattern is determined according to the first distance between the first virtual object and the second virtual object, the distance between the second virtual object and the first virtual object can be intuitively displayed, thereby improving the trueness of the virtual environment FIG. 15 shows a method flowchart of an information display method in a virtual environment according to an exemplary embodiment of this disclosure. The method may be applied to the implementation environment shown in FIG. 1.

In this embodiment, a terminal stores two sets of coordinate data (x, y) and (X, Y), where (x, y) is a coordinate of a virtual object in a predetermined behavior state, and (X. Y) is a coordinate of the virtual object in any behavior state. That is, in a case that the virtual object is in a predetermined behavior state, (x, y) and (X, Y) corresponding to the virtual object are the same; and in a case that the virtual object is not in the predetermined behavior state, the terminal only stores (X, Y) and does not store (x, y). In this embodiment, the predetermined behavior state includes at least one of moving, attacking, and spell casting.

The terminal detects, every predetermined time interval, whether the virtual object is performing a predetermined behavior such as moving, attacking, or spell casting, and if a player is performing the predetermined behavior, the terminal records coordinate (x, y) and (X, Y) of the virtual object; and uploads the coordinate (x, y) and (X, Y) to a server.

The server stores the coordinates (x, y) and (X, Y) in a stack in an array form; and calculates a first distance between any two sets of coordinates according to the coordinates recorded in the stack, to determine a calibration direction. The server first determines whether the first distance is within a predetermined distance and whether virtual objects corresponding to the two sets of coordinates belong to the same camp; and if the two sets of coordinates are within the predetermined distance and belong to different camps, the server determines whether the first distance between the two sets of coordinates is within a first distance range. If yes, the server delivers an instruction to the terminal to play a strong special effect in the calibration direction; and if the first distance is not within the first distance range, the server determines whether the first distance is within a second distance range. If yes, the server delivers an instruction to the terminal to play a moderate special effect in the calibration direction; and if the first distance is not within the second distance range, the server determines whether the first distance is within a third distance range. If yes, the server delivers an instruction to the terminal to play a weak special effect in the calibration direction, and if no, the server destroys data of the any two sets of coordinates.

In this embodiment, the special effect is the sound effect indication pattern in the foregoing embodiments. The server destroys the coordinate data on which calculation is completed, to relieve the pressure on the stack.

Figure 16:
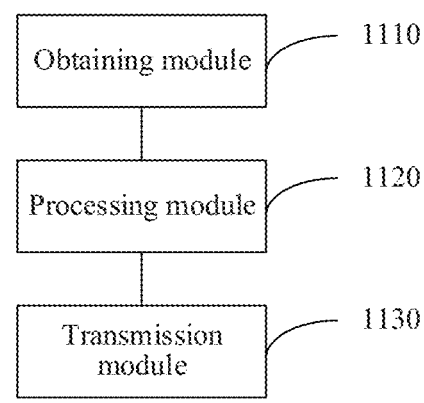
FIG. 16 is a structural block diagram of an information display apparatus in a virtual environment according to an exemplary embodiment of this disclosure.

FIG. 16 shows a structural block diagram of an information display apparatus in a virtual environment according to an exemplary embodiment of this disclosure. As shown in the figure, the apparatus may be applied to the server 130 in the implementation environment shown in FIG. 1, and the apparatus includes an obtaining module 1110, a processing module 1120, and a transmission module 1130:

the obtaining module 1110 is configured to obtain a first coordinate of a first virtual object in the virtual environment, and obtain, according to the first coordinate, a second coordinate of a second virtual object located in a first orientation of the first virtual object and in a predetermined behavior state;

the processing module 1120 is configured to calculate a first distance between the first virtual object and the second virtual object according to the first coordinate and the second coordinate; and obtain a sound effect intensity of the second virtual object in the first orientation according to the first distance; and the transmission module 1130 is configured to transmit a sound effect display instruction to a first terminal corresponding to the first virtual object, the sound effect display instruction being used for instructing the first terminal to display a sound effect indication pattern using the first virtual object as a center in the virtual environment, and the sound effect indication pattern being used for indicating that the second virtual object exists in a location region that is negatively correlated with the sound effect intensity in the first orientation.

In an optional embodiment, the sound effect display instruction includes the sound effect intensity, the sound effect intensity is used for instructing the first terminal to determine a pattern parameter of the sound effect indication pattern according to the sound effect intensity, and the pattern parameter includes at least one of a size, an area, an outline width, and a quantity of grains.

In an optional embodiment, the sound effect display instruction includes a predetermined behavior state, the predetermined behavior state being used for instructing the first terminal to determine a pattern type of the sound effect indication pattern according to the predetermined behavior state; and/or the sound effect display instruction includes a first orientation, the first orientation being used for instructing the first terminal to select a sound effect indication pattern corresponding to the first orientation from M sound effect indication patterns with different orientations, where M is a natural number, and M≥1.

In an optional embodiment, the obtaining module 1110 is further configured to transmit, in a case that the first virtual object and the second virtual object belong to different camps, the sound effect display instruction to the first terminal.

In an optional embodiment, the processing module 1120 is further configured to detect whether another virtual object in the predetermined behavior state exists in the first orientation, the another virtual object and the first virtual object belonging to different camps; and obtain, in a case that no other virtual object exists in the first orientation the sound effect intensity of the second virtual object in the first orientation according to the first distance.

In an optional embodiment, the processing module 1120 is further configured to determine a target distance range in which the first distance is located among N predetermined distance ranges, the N predetermined distance ranges being distance value ranges adjacent to each other in an end-to-end manner and not overlapping with each other, where N is a natural number, and N≥2; and determine the sound effect intensity of the second virtual object in the first orientation according to the target distance range.

In an optional embodiment, the processing module 1120 is further configured to detect whether a candidate virtual object in the predetermined behavior state exists in a detection region using the first coordinate as a center of a circle and a predetermined distance as a radius; calculate, in a case that at least two candidate virtual objects exist in the first orientation in the detection region, a distance between each candidate virtual object and the first virtual object; and determine a candidate virtual object that is closest to the first virtual object as the second virtual object.

In an optional embodiment, the obtaining module 1110 is further configured to obtain the first coordinate of the first virtual object in the virtual environment every predetermined time interval.

Figure 17:
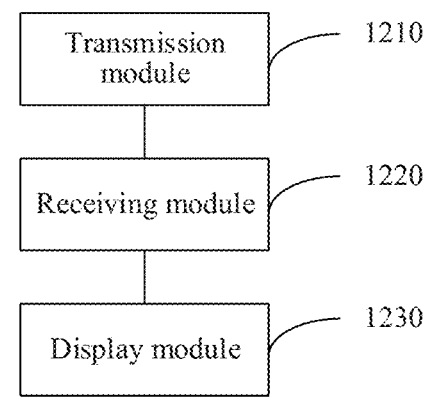
FIG. 17 is a structural block diagram of an information display apparatus in a virtual environment according to an exemplary embodiment of this disclosure.

FIG. 17 shows a structural block diagram of an information display apparatus in a virtual environment according to an exemplary embodiment of this disclosure. As shown in the figure, the apparatus may be applied to the first terminal 110 in the implementation environment shown in FIG. 1, and the apparatus includes a transmission module 1210, a receiving module 1220, and a display module 1230:

the transmission module 1210 is configured to transmit a first coordinate of a first virtual object in the virtual environment to a server;

the receiving module 1220 is configured to receive a sound effect display instruction transmitted by the server; and the display module 1230 is configured to display a sound effect indication pattern in the virtual environment according to the sound effect display instruction using the first virtual object as a center, the sound effect indication pattern being used for indicating that a second virtual object in a predetermined behavior state exists in a location region that is negatively correlated with a sound effect intensity in a first orientation of the first virtual object; and the sound effect display instruction being an instruction transmitted by the server after obtaining the sound effect intensity, the sound effect intensity being obtained by the server according to a first distance between the first virtual object and the second virtual object, and the first distance being obtained by the server, after obtaining a second coordinate of the second virtual object in the first orientation according to the first coordinate, through calculation according to the first coordinate and the second coordinate.

In an optional embodiment, the display module 1230 is further configured to determine a pattern parameter of the sound effect indication pattern according to the sound effect intensity, the pattern parameter including at least one of a size, an area, an outline width, and a quantity of grains.

In an optional embodiment, the sound effect display instruction further includes the predetermined behavior state and/or the first orientation; and the display module 1230 is further configured to determine a pattern type of the sound effect indication pattern according to the predetermined behavior state; and/or select a sound effect indication pattern corresponding to the first orientation from M sound effect indication patterns with different orientations, where M is a natural number, and M≥1.

In an optional embodiment, the transmission module 1210 is further configured to transmit the first coordinate to the server every predetermined time interval.

Figure 18:
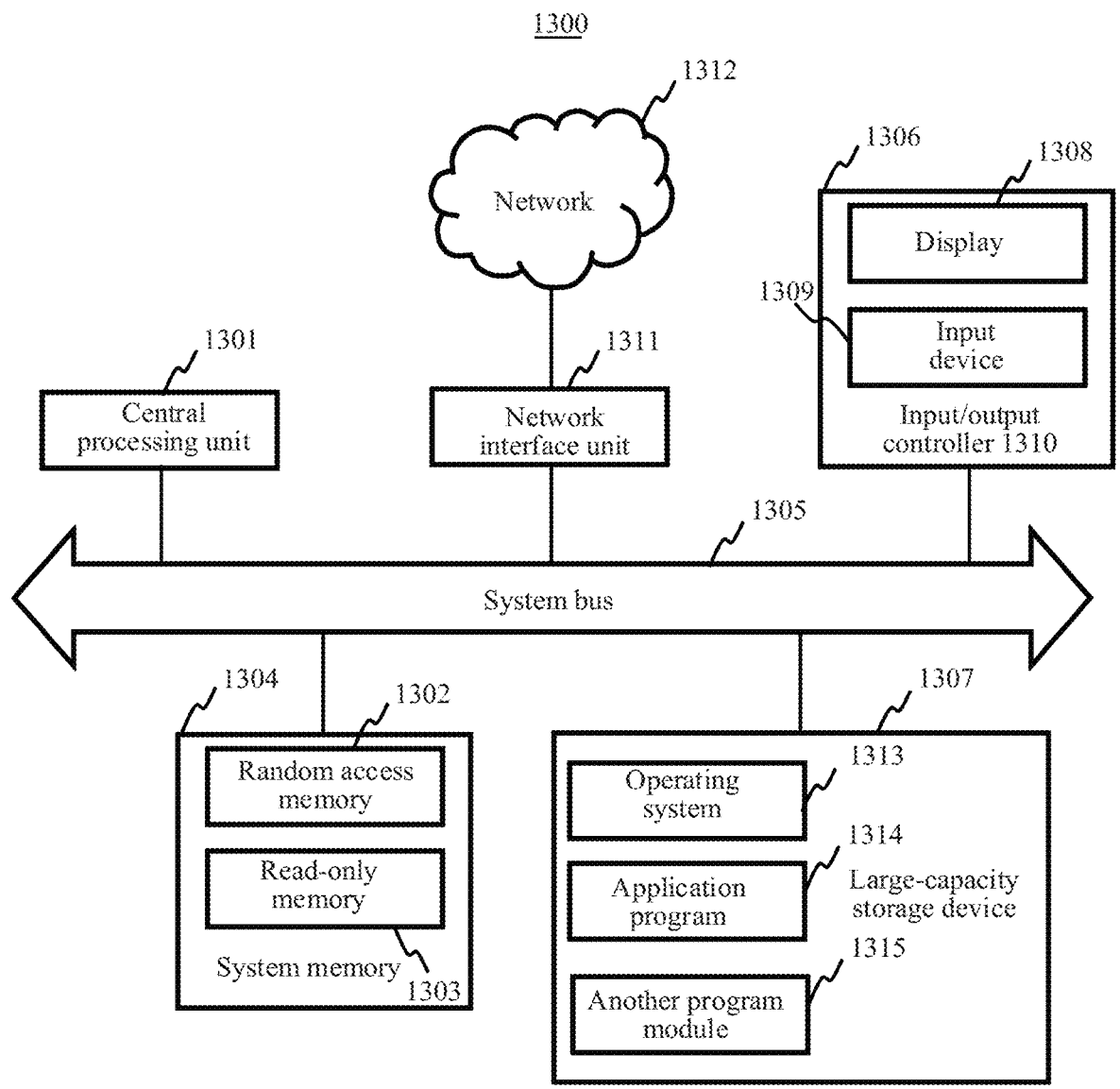
FIG. 18 is a structural block diagram of an electronic computer device according to an exemplary embodiment of this disclosure.

FIG. 18 shows a structural block diagram of a computer device according to an exemplary embodiment of this disclosure. The computer is configured to implement the information display method in a virtual environment on the server side according to the foregoing embodiments, and the computer device may be the server 130 in the embodiment of FIG. 1. Specifically:

The computer device 1300 includes a central processing unit (CPU) 1301, a system memory 1304 including a random access memory (RAM) 1302 and a read-only memory (ROM) 1303, and a system bus 1305 connecting the system memory 1304 and the CPU 1301. The computer device 1300 further includes a basic input/output system (I/O system) 1306 assisting in transmitting information between components in the computer, and a large-capacity storage device 1307 configured to store an operating system 1313, an application program 1314, and another program module 1315.

The basic input/output system 1306 includes a display 1308 configured to display information, and an input device 1309 configured to input information by a user, such as a mouse and a keyboard. The display 1308 and the input device 1309 are both connected to the CPU 1301 using an input/output controller 1310 that is connected to the system bus 1305. The basic I/O system 1306 may further include an input and output controller 1310 to be configured to receive and process inputs from multiple other devices such as a keyboard, a mouse, and an electronic stylus. Similarly, the input/output controller 1310 further provides an output to a display screen, a printer, or another type of output device.

The large-capacity storage device 1307 is connected to the CPU 1301 using a large-capacity storage controller (not shown) connected to the system bus 1305. The large-capacity storage device 1307 and a computer-readable medium associated with the large-capacity storage device provide non-volatile storage to the computer device 1300. That is to say, the large-capacity storage device 1307 may include the computer-readable medium (not shown) such as a hard disk or a CD-ROM driver.

In general, the computer-readable medium may include a computer storage medium and a communications medium. The computer storage medium includes volatile and non-volatile, removable and non-removable media that store information such as computer-readable instructions, data structures, program modules, or other data and that are implemented using any method or technology. The computer storage medium includes a RAM, a ROM, an EPROM, an EEPROM, a flash memory, or another solid state storage technology, a CD-ROM, a DVD, or another optical storage, a magnetic cassette, a magnetic tape, a magnetic disk storage, or another magnetic storage device. Certainly, persons skilled in art can know that the computer storage medium is not limited to the foregoing several types. The system memory 1304 and the large-capacity storage device 1307 may be collectively referred to as a memory.

According to the embodiments of the present disclosure, the computer device 1300 may be further connected, through a network such as the Internet, to a remote computer on the network, and run. That is, the computer device 1300 may be connected to a network 1312 using a network interface unit 1311 connected to the system bus 1305, or may be connected to another type of network or a remote computer system (not shown) using a network interface unit 1311.

The memory 1304 further includes one or more programs. The one or more programs are stored in the memory 1304 and configured to be executed by one or more processors. The one or more programs include instructions used for performing the information display method in a virtual environment on the server side according to the foregoing embodiments.

Figure 19:
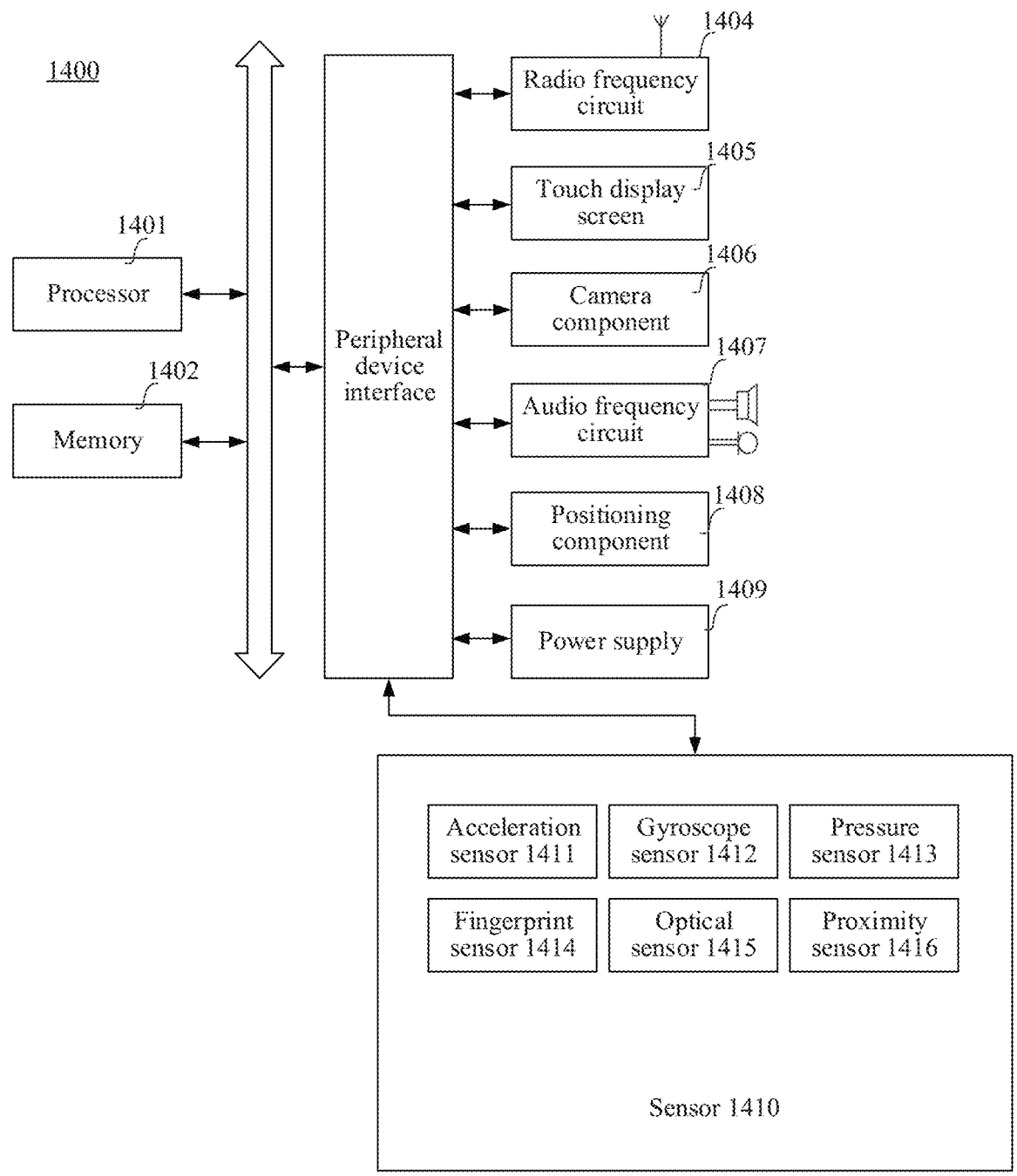
FIG. 19 is a structural block diagram of a terminal according to an exemplary embodiment of this disclosure.

FIG. 19 shows a structural block diagram of a terminal 1400 according to an exemplary embodiment of the disclosure. The terminal 1400 may be a portable mobile terminal, for example, a smartphone, a tablet computer, a moving picture experts group audio layer III (MP3) player, or a moving picture experts group audio layer IV (MP4) player. The terminal 1400 may be further referred to as other names such as user equipment and a portable terminal.

Generally, the terminal 1400 includes a processor 1401 and a memory 1402.

The processor 1401 may include one or more processing cores, for example, a 4-core processor or an 8-core processor. The processor 1401 may be implemented by at least one hardware form of a digital signal processor (DSP), a field-programmable gate array (FPGA), and a programmable logic array (PLA). The processor 1401 may alternatively include a main processor and a coprocessor. The main processor is configured to process data in an awake state, also referred to as a central processing unit (CPU), and the coprocessor is a low-power consumption processor configured to process data in an idle state. In some embodiments, the processor 1401 may be integrated with a graphics processing unit (GPU). The GPU is responsible for rendering and drawing content to be displayed by a display screen. In some embodiments, the processor 1401 may further include an artificial intelligence (AI) processor. The AI processor is configured to process a calculation operation related to machine learning.

The memory 1402 may include one or more computer-readable storage media. The computer-readable storage medium may be tangible and non-transient. The memory 1402 may further include a high-speed random access memory and a non-volatile memory, for example, one or more disk storage devices, or flash memory devices. In some embodiments, the non-transient computer-readable storage medium in the memory 1402 is configured to store at least one instruction, and the at least one instruction is configured to be executed by the processor 1401 to implement the information display method in a virtual environment provided in this disclosure.

In some embodiments, the terminal 1400 further optionally includes a peripheral device interface 1403 and at least one peripheral device. Specifically, the peripheral device includes: at least one of a radio frequency (RF) circuit 1404, a touch display screen 1405, a camera component 1406, an audio frequency circuit 1407, a positioning component 1408, and a power source 1409.

The peripheral device interface 1403 may be configured to connect at least one peripheral device related to input/output (I/O) to the processor 1401 and the memory 1402. In some embodiments, the processor 1401, the memory 1402, and the peripheral device interface 1403 are integrated into the same chip or circuit board. In some other embodiments, any one or two of the processor 1401, the memory 1402, and the peripheral device interface 1403 may be implemented on an independent chip or circuit board, and the implementation is not limited in this embodiment.

The radio frequency circuit 1404 is configured to receive and transmit a radio frequency (RF) signal, also referred to as an electromagnetic signal. The radio frequency circuit 1404 communicates with a communications network and another communications device using the electromagnetic signal. The radio frequency circuit 1404 may convert an electric signal into an electromagnetic signal for transmission, or convert a received electromagnetic signal into an electric signal. Optionally, the radio frequency circuit 1404 includes an antenna system, an RF transceiver, one or more amplifiers, a tuner, an oscillator, a digital signal processor, a codec chip set, a subscriber identity module card, and the like. The radio frequency circuit 1404 may communicate with another terminal using a wireless communication protocol. The wireless communication protocol includes, but is not limited to: a world wide web, a metropolitan area network, an intranet, generations of mobile communication networks (2G, 3G, 4G, and 5G), a wireless local area network and/or a wireless fidelity (Wi-Fi) network. In some embodiments, the radio frequency circuit 1404 may further include a near field communication (NFC) related circuit, and is not limited in this disclosure.

The touch display screen 1405 is configured to display a user interface (UI). The UI may include a graph, text, an icon, a video, and any combination thereof. The touch display screen 1405 also has a capability of collecting a touch signal on or above a surface of the touch display screen 1405. The touch signal may be used as a control signal to be inputted into the processor 1401 for processing. The touch display screen 1405 is configured to provide a virtual button and/or a virtual keyboard, which is also referred to as a soft button and/or a soft keyboard. In some embodiments, there may be one touch display screen 1405, disposed on a front panel of the terminal 1400. In some other embodiments, there may be at least two touch display screens 1405, disposed on different surfaces of the terminal 1400 respectively or in a folded design. In some more embodiments, the touch display screen 1405 may be a flexible display screen, disposed on a curved surface or a folded surface of the terminal 1400. Even, the touch display screen 1405 may be further set in a non-rectangular irregular pattern, namely, a special-shaped screen. The touch display screen 1405 may be made of a material such as a liquid crystal display (LCD) or an organic light-emitting diode (OLED).

The camera component 1406 is configured to collect an image or a video. Optionally, the camera component 1406 includes a front-facing camera and a rear-facing camera. Generally, the front-facing camera is configured to implement a video call or self-portrait. The rear-facing camera is configured to shooting a picture or a video. In some embodiments, there are at least two rear-facing cameras, each of which is any one of a main camera, a depth of field camera and a wide-angle camera, so as to implement a background blurring function by fusing the main camera and the depth of field camera, and panoramic shooting and virtual reality (VR) shooting functions by fusing the main camera and the wide-angle camera. In some embodiments, the camera component 1406 may further include a flash. The flash may be a monochrome temperature flash, or may be a double color temperature flash. The double color temperature flash refers to a combination of a warm flash and a cold flash, and may be configured to perform light ray compensation at different color temperatures.

The audio frequency circuit 1407 is configured to provide an audio interface between a user and the terminal 1400. The audio frequency circuit 1407 may include a microphone and a speaker. The microphone is configured to collect a sound wave of a user and an environment, and convert the sound wave into the electrical signal to be input to the processor 1401 for processing, or to be input to the RF circuit 1404 for implementing voice communication. For the purpose of stereo sound collection or noise reduction, there may be a plurality of microphones, respectively disposed at different parts of the terminal 1400. The microphone may be further a microphone array or an omnidirectional collection microphone. The loudspeaker is configured to convert electric signals from the processor 1401 or the radio frequency circuit 1404 into sound waves. The loudspeaker may be a conventional thin-film loudspeaker or a piezoelectric ceramic loudspeaker. When the loudspeaker is the piezoelectric ceramic loudspeaker, electric signals not only can be converted into sound waves that can be heard by human, but also can be converted into sound waves that cannot be heard by human for ranging and the like. In some embodiments, the audio circuit 1407 may further include an earphone jack.

The positioning component 1408 is configured to determine a current geographic location of the terminal 1400 through positioning, to implement a navigation or a location based service (LBS). The positioning component 1408 may be a positioning component based on the global positioning system (GPS) of the United States, China's Beidou Navigation Satellite System (BDS), or the Galileo system of Russia.

The power supply 1409 is configured to supply power to components in the terminal 1400. The power supply 1409 may be an alternating current, a direct current, a primary battery, or a rechargeable battery. In a case that the power supply 1409 includes the rechargeable battery, the rechargeable battery may be a wired charging battery or a wireless charging battery. The wired charging battery is a battery charged through a wired line, and the wireless charging battery is a battery charged through a wireless coil. The rechargeable battery may be further configured to support a quick charge technology.

In some embodiments, the terminal 1400 further includes one or more sensors 1410. The one or more sensors 1410 include, but are not limited to, an acceleration sensor 1411, a gyroscope sensor 1412, a pressure sensor 1413, a fingerprint sensor 1414, an optical sensor 1415, and a proximity sensor 1416.

The acceleration sensor 1411 may detect accelerations on three coordinate axes of a coordinate system established by the terminal 1400. For example, the acceleration sensor 1411 may be configured to detect components of gravity acceleration on the three coordinate axes. The processor 1401 may control, according to a gravity acceleration signal collected by the acceleration sensor 1411, the touch display screen 1405 to display the user interface in a frame view or a portrait view. The acceleration sensor 1411 may be further configured to collect motion data of a game or a user.

The gyroscope sensor 1412 may detect a body direction and a rotation angle of the terminal 1400. The gyroscope sensor 1412 may cooperate with the acceleration sensor 1411 to collect a 3D action by the user on the terminal 1400. The processor 1401 may implement the following functions according to data collected by the gyroscope sensor 1412: motion sensing (for example, the UI is changed according to a tilt operation of the user), image stabilization during shooting, game control, and inertial navigation.

The pressure sensor 1413 may be disposed on a side frame of the terminal 1400 and/or a lower layer of the touch display screen 1405. When the pressure sensor 1413 is disposed at the side frame of the terminal 1400, a holding signal of the user on the terminal 1400 may be detected, and left/right hand identification and a quick action may be performed according to the holding signal. When the pressure sensor 1413 is disposed at the lower layer of the touch display screen 1405, an operable control on the UI interface can be controlled according to a pressure operation of the user on the touch display screen 1405. The operable control includes at least one of a button control, a scroll-bar control, an icon control and a menu control.

The fingerprint sensor 1414 is configured to collect a user's fingerprint to identify a user's identity according to the collected fingerprint. When identifying that the user's identity is a trusted identity, the processor 1401 authorizes the user to perform related sensitive operations. The sensitive operations include: unlocking a screen, viewing encryption information, downloading software, paying, changing a setting, and the like. The fingerprint sensor 1414 may be disposed on a front surface, a back surface, or a side surface of the terminal 1400. When a physical button or a vendor logo is disposed on the terminal 1400, the fingerprint sensor 1414 may be integrated together with the physical button or the vendor logo.

The optical sensor 1415 is configured to collect ambient light intensity. In an embodiment, the processor 1401 may control display luminance of the touch display screen 1405 according to the ambient light intensity collected by the optical sensor 1415. Specifically, when the ambient light intensity is relatively high, the display luminance of the touch display screen 1405 is increased. When the ambient light intensity is relatively low, the display luminance of the touch display screen 1405 is reduced. In another embodiment, the processor 1401 may further dynamically adjust shooting parameters of the camera component 1406 according to the ambient light intensity collected by the optical sensor 1415.

The proximity sensor 1416, also referred to as a distance sensor, is generally disposed on the front surface of the terminal 1400. The proximity sensor 1416 is configured to collect a distance between the user and the front surface of the terminal 1400. In an embodiment, when the proximity sensor 1416 detects that the distance between the user and the front surface of the terminal 1400 gradually becomes smaller, the touch display screen 1405 is controlled by the processor 1401 to switch from a screen-on state to a screen-off state. In a case that the proximity sensor 1416 detects that the distance between the user and the front surface of the terminal 1400 gradually becomes larger, the touch display screen 1405 is controlled by the processor 1401 to switch from the screen-off state to the screen-on state.

A person skilled in the art may understand that the structure shown in FIG. 19 does not constitute any limitation on the terminal 1400, and the terminal may include more components or fewer components than those shown in the figure, or some components may be combined, or a different component deployment may be used This disclosure further provides a computer-readable storage medium, storing at least one instruction, at least one program, and a code set or an instruction set, the at least one instruction, the at least one program, the code set or the instruction set being loaded and executed by a processor to implement the information display method in a virtual environment according to the foregoing method embodiments.

Optionally, this disclosure further provides a computer program product including an instruction. When run on a computer, the computer program product causes the computer to perform the information display method in a virtual environment according to the foregoing aspects.

It is to be understood that "a plurality of" described in this specification refers to two or more. "And/or" describes an association relationship for describing associated objects and represents that three relationships may exist. For example, A and/or B may represent the following three cases: Only A exists, both A and B exist, and only B exists. The character "/" in this specification generally indicates an "or" relationship between the associated objects.

The sequence numbers of the foregoing embodiments of this disclosure are merely for the convenience of description, and do not imply the preference among the embodiments.

A person of ordinary skill in the art may understand that all or some of the steps of the embodiments may be implemented by hardware or a program instructing related hardware. The program may be stored in a computer-readable storage medium. The storage medium may be: a read-only memory, a magnetic disk, or an optical disc.

The foregoing descriptions are merely exemplary embodiments of this disclosure, but are not intended to limit this disclosure. Any modification, equivalent replacement, or improvement made within the spirit and principle of this disclosure shall fall within the protection scope of this disclosure.

What is claimed is:

1. An information display method in a virtual environment, comprising:
   obtaining a first coordinate of a first virtual object in the virtual environment;
   obtaining, according to the first coordinate, a second coordinate of a second virtual object located in a first orientation of the first virtual object and in a predetermined behavior state; calculating a first distance between the first virtual object and the second virtual object according to the first coordinate and the second coordinate;
   obtaining a sound effect intensity of the second virtual object in the first orientation according to the first distance, the sound effect intensity indicating an intensity of a sound effect generated by the second virtual object, the sound effect being generated based on the predetermined behavior state of the second virtual object; and
   transmitting a sound effect display instruction to a first terminal corresponding to the first virtual object, the sound effect display instruction instructing the first terminal to display a sound effect indication pattern using the first virtual object as a center in the virtual environment, and the sound effect indication pattern visualizing the sound effect intensity of the second virtual object, and indicating that the second virtual object exists in a location region that is negatively correlated with the sound effect intensity in the first orientation.

2. The method of claim 1, wherein the sound effect display instruction comprises the sound effect intensity, the sound effect intensity is for instructing the first terminal to determine a pattern dimension of the sound effect indication pattern according to the sound effect intensity, and the pattern dimension comprises at least one of a size, an area, an outline width, or a quantity of grains of the sound effect indication pattern.

3. The method of claim 2, wherein the at least one of the size, the area, the outline width, or the quantity of grains is positively correlated with the first distance.

4. The method of claim 2, wherein the sound effect display instruction comprises the predetermined behavior state, and the predetermined behavior state is for instructing the first terminal to determine a pattern shape of the sound effect indication pattern according to the predetermined behavior state.

5. The method of claim 2, wherein the sound effect display instruction comprises the first orientation, and the first orientation is for instructing the first terminal to select a sound effect indication pattern corresponding to the first orientation from M sound effect indication patterns with different orientations, wherein M is a natural number and M is greater than or equal to 1.

6. The method of claim 1, wherein the obtaining the first coordinate of a first virtual object in the virtual environment comprises:
   obtaining the first coordinate in response to the first virtual object and the second virtual object belonging to different camps.

7. The method of claim 1, wherein the obtaining the sound effect intensity of the second virtual object in the first orientation according to the first distance comprises:
   detecting whether a third virtual object in the predetermined behavior state exists in the first orientation, the third virtual object and the first virtual object belonging to different camps; and
   in response to the third virtual object not existing in the first orientation, obtaining the sound effect intensity of the second virtual object in the first orientation according to the first distance.

8. The method of claim 1, wherein the obtaining the sound effect intensity of the second virtual object in the first orientation according to the first distance comprises:
   determining a target distance range in which the first distance is located from N predetermined distance ranges, the N predetermined distance ranges being distance value ranges adjacent to each other in an end-to-end manner and not overlapping with each other, wherein N is a natural number and N is greater than or equal to 2; and
   determining the sound effect intensity of the second virtual object in the first orientation according to the target distance range.

9. The method of claim 1, further comprising:
   detecting whether a candidate virtual object in the predetermined behavior state exists in a detection region with the first coordinate as a center of a circle and a predetermined distance as a radius;
   in response to at least two candidate virtual objects existing in the first orientation in the detection region, calculating a distance from the first virtual object to each of the at least two candidate virtual objects; and
   determining one of the at least two candidate virtual object to which a distance from the first virtual object being shortest as the second virtual object.

10. The method of claim 9, the detection region is entirely located in a display region of the virtual environment.

11. The method of claim 1, wherein the obtaining the first coordinate of a first virtual object in the virtual environment comprises:
    obtaining the first coordinate of the first virtual object in the virtual environment every predetermined time interval.

12. An information display method in a virtual environment, comprising:
    transmitting a first coordinate of a first virtual object in the virtual environment to a server;
    receiving a sound effect display instruction from the server;
    displaying a sound effect indication pattern in the virtual environment using the first virtual object as a center, the sound effect indication pattern indicating that a second virtual object in a predetermined behavior state exists in a location region that is negatively correlated with a sound effect intensity in a first orientation of the first virtual object; and
    wherein the sound effect display instruction is transmitted by the server subsequent to obtaining the sound effect intensity, the sound effect intensity indicates an intensity of a sound effect generated by the second virtual object, the sound effect is generated based on the predetermined behavior state of the second virtual object and is obtained by the server according to a first distance between the first virtual object and the second virtual object, the first distance is calculated by the server according to the first coordinate and a second coordinate of the second virtual object in the first orientation, the second coordinate is obtained according to the first coordinate, the sound effect indication pattern visualizes the sound effect intensity.

13. The method of claim 12, wherein the sound effect display instruction comprises the sound effect intensity and the method further comprises:

prior to displaying the sound effect indication pattern in the virtual environment, determining a pattern dimension of the sound effect indication pattern according to the sound effect intensity, the pattern dimension comprising at least one of a size, an area, an outline width, or a quantity of grains of the sound effect indication pattern.

14. The method of claim 13, wherein the sound effect display instruction further comprises the predetermined behavior state and the method further comprises:

determining a pattern shape of the sound effect indication pattern according to the predetermined behavior state.

15. The method of claim 13, wherein the sound effect display instruction further comprises the first orientation and the method further comprises:

selecting a sound effect indication pattern corresponding to the first orientation from M sound effect indication patterns with different orientations, wherein M is a natural number and M is greater than or equal to 1.

16. The method of claim 12, wherein the transmitting the first coordinate of the first virtual object in the virtual environment to the server comprises:

transmitting the first coordinate to the server every predetermined time interval.

17. The method of claim 12, wherein the displaying the sound effect indication pattern in the virtual environment comprises:

in response to detecting that an environment image is displayed close to the first coordinate, displaying the sound effect indication pattern covering the environment image.

18. An information display method in a virtual environment, comprising:

displaying a first display picture of the virtual environment observed from a first viewing angle, the first display picture displaying an object model of a first virtual object; and in response to a second virtual object in a predetermined behavior state existing in a first orientation of the first virtual object in the virtual environment, displaying a sound effect indication pattern using the first virtual object as a center, the sound effect indication pattern pointing to a direction of a location of the second virtual object and indicating that a second virtual object exists in a location region that is negatively correlated with a sound effect intensity in a first orientation of the first virtual object, the sound effect intensity indicating an intensity of a sound effect generated by the second virtual object, the sound effect being generated based on the predetermined behavior state of the second virtual object, the sound effect indication pattern visualizing the sound effect intensity.

19. The method of claim 18, wherein the displaying the first display picture of the virtual environment observed from the first viewing angle comprises:

displaying the first display picture observed from an oblique view.

20. The method of claim 19, wherein the sound effect indication pattern comprises a pattern dimension, the pattern dimension is determined according to a first distance between the first virtual object and the second virtual object, and the pattern dimension comprises at least one of a size, an area, an outline width, or a quantity of grains of the sound effect indication pattern.

* * * * *